United States Patent [19]

Kloker et al.

[11] Patent Number: 5,359,626
[45] Date of Patent: Oct. 25, 1994

[54] SERIAL INTERFACE BUS SYSTEM FOR TRANSMITTING AND RECEIVING DIGITAL AUDIO INFORMATION

[75] Inventors: Kevin L. Kloker, Arlington Heights; Thomas L. Wernimont, Palatine, both of Ill.; Clif Liu, San Diego, Calif.

[73] Assignee: Motorola, Inc., Schaumburg, Ill.

[21] Appl. No.: 939,770

[22] Filed: Sep. 2, 1992

[51] Int. Cl.⁵ ............................................. H04B 1/38
[52] U.S. Cl. ......................................... 375/7; 375/121; 370/85.9
[58] Field of Search .................. 375/7, 36, 121, 106, 375/107; 381/31; 370/58.2, 67, 85.1, 85.9, 85.11, 110.1

[56] References Cited

U.S. PATENT DOCUMENTS

| | | | |
|---|---|---|---|
| 5,182,746 | 1/1993 | Hurlbut et al. | 375/106 |
| 5,214,705 | 5/1993 | Kloker et al. | 375/25 |
| 5,243,593 | 9/1993 | Timbs | 375/7 |

OTHER PUBLICATIONS

"AES Recommended Practice for Digital Audio Engineering-Serial Transmission Format for Lin early Represented Digital Audio Data" published by Audio Engineering Society in 1985, pp. 1-9.
"CP-340 Digital Audio Interface" published by the Standards of Electronic Industries Association of Japan in Sep. of 1987, pp. 1-32.
"CS4215 16-Bit, 48kHz, Multimedia Audio Codec" published by Crystal Semiconductor Corproration in Mar., 1992, pp. 1-30.
"DSP56401 AES/EBU/CP340 Digital Audio Transceiver" published by Motorola, Inc. in 1992, pp. 1-84.
"DSP5600/DSP56001 Digital Signal Processor User's Manual," Rev. 2 published by Motorola, Inc. in 1990, pp. 11-93, to 11-127.
"Telecommunications Device Data" published by Motorola, Inc. in 1984, pp. 2-164 to 2-183.

*Primary Examiner*—Stephen Chin
*Assistant Examiner*—Don Vo
*Attorney, Agent, or Firm*—Elizabeth A. Apperley

[57] ABSTRACT

A serial interface bus system for transmitting and receiving a plurality of bus signals which collectively allow communication of data between a digital audio source (12, 22, 24, 26, 56, 82) such as a compact disc and a digital sink (42, 52, 62, 64, 66) such as a digital signal processor. The plurality of bus signals provided by the interface bus system allow many different audio sources and sinks to be used without glue logic. The plurality of bus signals allow multiple transceivers to be configured in a daisy chain (20, 60) wherein a master is selectively chosen to optimize performance of such a system. The daisy chain configuration may be implemented to provide digital data to a wide variety of storage circuits for digital information.

27 Claims, 9 Drawing Sheets

SERIAL INTERFACE BUS SYSTEM FOR TRANSMITTING AND RECEIVING DIGITAL AUDIO INFORMATION

FIELD OF THE INVENTION

This invention relates generally to a communications system, and more particularly to serial data bus protocols in a communications system.

BACKGROUND OF THE INVENTION

In a digital communications system, digital audio data and control information is transmitted in a predetermined serial transmission format such as AES-EBU (Audio Engineering Society-European Broadcast Union) or CP-340 (a name given the standard developed by the Electronics Industries Association of Japan). Both the AES-EBU and CP-340 formats were developed for serial transmission of two channels, each having digital audio data and non-audio, or control, data from a transmitter to one or a plurality of receivers. For more detailed information on the AES-EBU format, refer to "AES Recommended Practice for Digital Audio Engineering-Serial Transmission Format for Linearly Represented Digital Audio Data" published by the Audio Engineering Society in 1985. Similarly, for information concerning the CP-340 format, refer to "EIAJ CP-340 Digital Audio Interface" published by the Standards of Electronic Industries Association of Japan in 1987.

Both the AES-EBU and CP-340 formats are commonly used for transmitting digital audio and non-audio data between a compact disc player, a digital audio tape player, an audio mixing board, studio recording equipment, and consumer musical instruments. Because of the wide applications of the AES-EBU and CP-340 formats for transmission of audio information, it is useful for a digital signal processor to also be compatible with this digital audio format. When transferring digital audio information from a transmitter, such as a compact disc player or a digital audio tape player, to a digital signal processor, the digital data is typically provided to an interface transceiver where it is modified to a form in which it may be used by the digital signal processor.

In some cases, several sources of digital audio data may be used to provide signals which are related. For example, in a recording studio, an audio mixing board may be used in conjunction with several digital audio storage devices. Each of the digital audio storage devices has an input which is compatible with the AES-EBU or the CP-E40 format. These storage devices may be hard disk drives, digital audio tape players, or even compact disc players with standard pre-recorded samples.

Several techniques exist for configuring a system which has multiple sources of digital audio data. For example, a digital signal processor (DSP) may be dedicated for use with each one of the interface transceivers. With appropriate synchronization, the digital audio data would then be processed in parallel by the digital signal processors. However, digital signal processors are typically costly. Therefore, the number of digital signal processors implemented in a system should be minimized to decrease expense.

In some telecommunications applications, multiple digital data sources are interfaced with a microprocessor using a time slot assigner circuit. In such a system, the digital data sources are typically codecs. An example of a time slot assigner circuit is a Motorola MC14416 circuit which is commercially available from Motorola, Inc. of Schaumburg, Ill. In a system which uses a time slot assigner circuit, each of the multiple digital data sources is assigned a time slot for communication with the microprocessor. The time slot assigner enables a first one of the plurality of digital data sources to communicate with the microprocessor at a first time slot. At a second time slot, the time slot assigner enables a second one of the plurality of digital data sources to communicate with the microprocessor. In summary, each one of a plurality of digital data sources is assigned a time slot for communication with the microprocessor. Additionally, the added circuitry is costly to implement in a communications system and should be eliminated whenever possible.

Similarly, a digital signal processor may interface with a plurality of digital data sources. The plurality of digital data sources are generally implemented as either other digital signal processors or codecs. Like the time slot assigner circuits, this implementation is provided only for telecommunications applications and digital audio communication applications. To interface with the plurality of digital data sources, the digital signal processor must be operated in a specific mode of operation which is generally referred to as "Network Mode." In such a mode of operation, the digital signal processor would be a "master" device which controlled all of the plurality of digital data sources. The digital signal processor assigns each one of the plurality of digital data sources a time slot in which data is to be either transmitted or received. Additionally, the digital data sources must be able to recognize which time slot is currently executed and whether data should be communicated. Therefore, such a system requires "smart" digital data sources which are able to determine and track a time slot. Such smart digital data sources are usually digital signal processors. Other commonly used digital audio devices generally do not have the "intelligence" to recognize time slots without some sort of human support. Again, however, digital signal processors are costly to implement and should be minimally used in a system. The network mode of operation is implemented on the Motorola DSP 56000 digital signal processor which is available from Motorola, Inc. of Austin, Tex. For more information on the network mode of operation and the DSP56000, refer to "DSP56000/DSP56001 Digital Signal Processor User's Manual."

The telecommunications applications described herein do not correlate well or provide a solution to a problem which is increasingly occurring in digital audio data processing systems. Multiple digital sources are required to provide a plurality of digital audio signals. However, multiple digital signal processors which are required to process each of the plurality of digital audio signals are typically too costly to implement. The telecommunications applications described herein are too costly to implement in a digital audio communications system and do not provide the flexibility required by such a system.

Therefore, a need exists for a digital audio communications system in which a minimal number of digital signal processors may be used with a plurality of digital audio sources to provide digital audio information without great expense.

SUMMARY OF THE INVENTION

The previously mentioned needs are fulfilled with the present invention. Accordingly, there is provided, in a first form, a receiver for communicating a plurality of digital data values between a modulated digital audio source and an unmodulated data sink via an interface bus. The interface bus includes a receive enable conductor for providing an receive enable signal to the receiver. The receive enable input selectively enables the receiver to communicate digital data. The interface bus also includes a receive system clock conductor for providing a system clock signal to the receiver. The receive system clock is selectively enabled in response to the receive enable signal. A plurality of digital data conductors, a first portion of the plurality of digital data values communicating digital audio values and a second portion of the plurality of digital data values communicating digital non-audio data values, each of the digital audio and non-audio data values being communicated in a predetermined format. The interface bus includes a receive input synchronization conductor for communicating a receive input synchronization signal. The receive input synchronization signal indicates a start of communication of either one or both of a first one of the plurality of digital audio data values and a first one of the plurality of digital non-audio data values. The interface bus also includes a receive output synchronization conductor for communicating a receive output synchronization signal. The receive output synchronization signal indicates an end of communication of either one or both of the first one of the plurality of digital audio data values and the first one of the plurality of digital non-audio data values.

Accordingly, there is provided, in a second form, a transmitter for communicating digital data between an unmodulated data source and a modulated digital audio sink via an interface bus. The interface bus includes a transmit enable conductor for providing a transmit enable signal to the transmitter. The transmit enable input selectively enables the transmitter to communicate digital data. A transmit system clock conductor is also included in the transmitter for providing a system clock signal to the transmitter. The transmit system clock is selectively enabled in response to the transmit enable signal. The interface bus includes a plurality of digital data conductors with a first portion of the plurality of digital data values communicating digital audio values and a second portion of the plurality of digital data values communicating digital non-audio data values. Each of the digital audio and non-audio data values is communicated in a predetermined format. The interface bus includes a transmit input synchronization conductor for communicating a transmit input synchronization signal. The transmit input synchronization signal indicates a start of communication of either one or both of a first one of the plurality of digital audio data values and a first one of the plurality of digital non-audio data values. The interface bus also includes a transmit output synchronization conductor for communicating a transmit output synchronization signal. The transmit output synchronization signal indicates an end of communication of either one or both of the first one of the plurality of digital audio data values and the first one of the plurality of digital non-audio data values.

These and other features, and advantages, will be more clearly understood from the following detailed description taken in conjunction with the accompanying drawing.

DETAILED DESCRIPTION OF A PREFERRED EMBODIMENT

Figure 1:
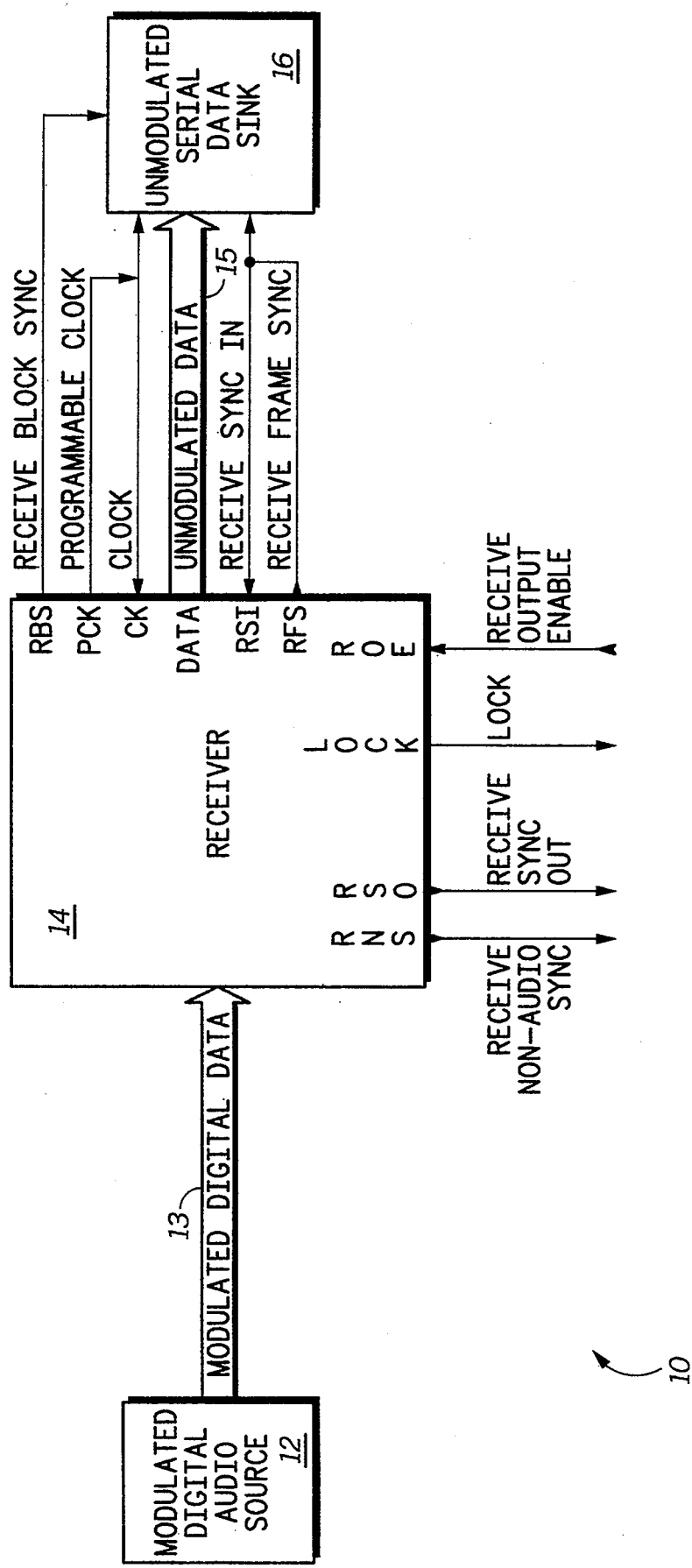
FIG. 1 illustrates in a block diagram form a communications system for transferring digital audio information from a digital audio source to a storage circuit in accordance with the present invention.

During a description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

A brief overview of the AES-EBU and CP-340 digital audio data and control transmission formats will be provided to define a few of the terms associated with digital audio transmission. Both the AES-EBU and CP-340 formats transmit digital audio and non-audio data in a series of frames. The digital audio and non-audio data is typically sampled periodically by a source frequency and formed into a left audio or a right audio channel of two's complement data. The left and right channels of digital audio and non-audio data each form a subframe. The digital audio and non-audio data is transferred in a Manchester encoded format.

Two subframes, one for left channel information and a second for right channel information, are transmitted in sequence in any one period of the source frequency. The two subframes may also be collectively referred to as a frame. Each subframe has a length of thirty-two time slots, where each time slot corresponds to a data bit of digital audio or non-audio information. Typically, the first four bits of each subframe are preamble bits. Preamble bits are encoded to synchronize a receiver to the source frequency of the transmitter. The next twenty-four bits transfer digital audio data information in two's complement form. The last four bits generally contain digital non-audio information used to provide information about the digital audio data. The digital non-audio information may indicate whether the audio data information was transmitted to the receiver without any errors, user information, or parity of a subframe currently being transmitted. Additionally, the non-audio information is often used to control transmission of digital audio and non-audio data.

In a first form, the present invention provides an interface receiver for receiving a plurality of data values in an AES-EBU or CP-340 format, processing the plurality of data values, and communicating the data values and corresponding control signals. Additionally, the interface receiver may receive the plurality of data values in a format which is compatible with the AES-EBU and CP-340 formats. For example, the interface receiver described herein may also receive the plurality of data values in the IEC958 format. The interface receiver described herein provides a plurality of bus signals which collectively allow communication of data between a digital audio source such as a compact disc or a digital audio tape and a digital sink such as a digital signal processor or a digital to analog (D-A) converter. The plurality of bus signals provided by the interface receiver allow many different storage devices to be used without glue logic. Additionally, the plurality of bus signals provided by the interface receiver allow multiple receivers to be configured in a daisy chain configuration wherein the master is selectively chosen to optimize the performance of such a system. The daisy chain configuration may be implemented to provide digital data to a wide variety of storage circuits for digital information.

In a second form, the present invention provides an interface transmitter for transmitting data from a storage circuit to a digital audio sink. A digital audio sink may be implemented as a digital audio tape recorder, an audio mixing board, or even a computer. In addition to the data, the interface transmitter provides a plurality of bus signals which transfer control information to the digital audio sink. As with the interface receiver, the plurality of bus signals provided by the interface transmitter allows a plurality of transmitters to be configured to transmit data from a single storage circuit to a plurality of digital audio sinks without additional glue logic. Again, a master transmitter is selectively chosen to optimize performance of the system.

By providing both an interface receiver and an interface transmitter which enables a digital audio system to have the ability to interface with a plurality of devices, the flexibility of the system is enhanced. Additionally, by providing the bus control signals necessary to allow daisy chaining without glue logic and in which the master receiver or transmitter is selectively chosen, performance of the system may be optimized.

FIG. 1 illustrates one embodiment of the invention in a digital audio communication system 10. Communication system 10 includes a modulated digital audio source 12, a receiver 14, and an unmodulated serial data sink 16. As an example, modulated digital audio source 12 may be implemented as a compact disc player or a digital audio tape player. Additionally, unmodulated serial data sink 16 may be implemented as a digital signal processor or a D-A converter in some implementations of the invention.

Modulated digital audio source 12 is connected to receiver 14 via a Modulated Digital Data bus 13 to provide digital audio data. Receiver 14 has a first output for providing a Receive Non-Audio Sync (RNS) signal, a second output for providing a Receive Sync Out (RSO) signal, and a third output for providing a Lock signal. The first, second, and third outputs are respectively referred to as a RNS, RSO, and Lock output.

Receiver 14 is coupled to unmodulated serial data sink 16 to communicate a plurality of audio data and control signals. An Unmodulated Data Bus 15 provides digital audio information from a first one of a plurality of outputs collectively referred to as Data of receiver 14 to unmodulated serial data sink 16. Unmodulated Data bus 15 includes a plurality of conductors for transferred both digital audio and non-audio, or control, signals. Additionally, receiver 14 provides a Receive Block Sync (RBS) signal to unmodulated serial data sink 16 via a RBS output. Unmodulated serial data sink 16 receives a Clock (CK) signal from an output of receiver 14. An output of receiver 14 labeled "PCK" also provides a programmed clock signal to the first input of receiver 14. A Receive Frame Sync (RFS) output of receiver 14 is connected to a Receive Sync In (RSI) input of receiver 14 to provide the RFS signal. The RSI input is also connected to unmodulated serial data sink 16 to provide a Receive Sync In signal. Additionally, a Receive Output Enable (ROE) signal is provided to receiver 14 via an ROE input. The ROE signal is a control signal which may be provided by an external master controller (not shown in FIG. 1) or even unmodulated serial data sink 16.

Figure 2:
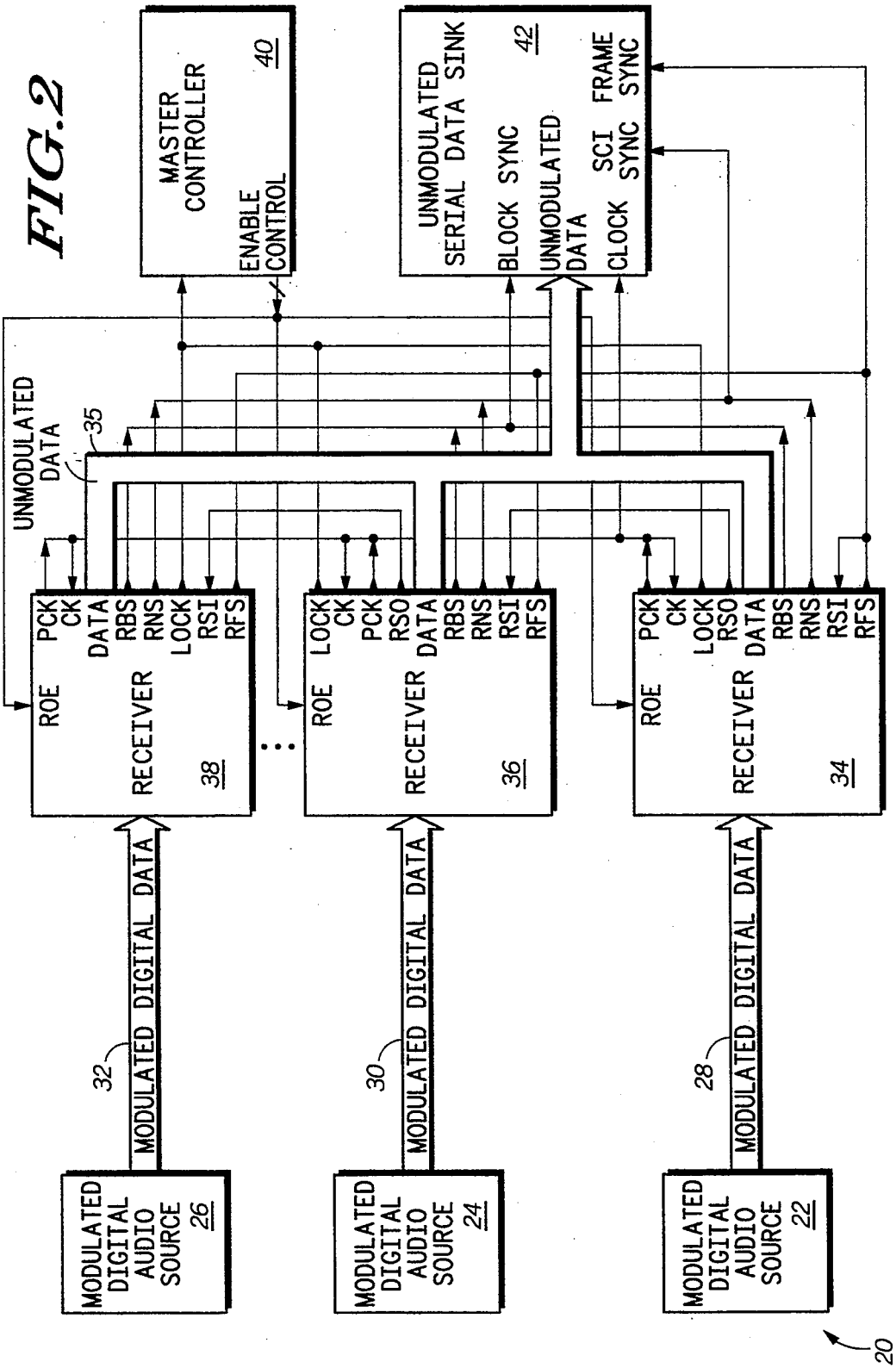
FIG. 2 illustrates in block diagram form a communications system having multiple receivers in a "daisy-chain" configuration.

FIG. 2 illustrates a digital audio system 20 which is configured in a daisy chain. In the daisy chain configuration, digital audio system 20 includes a plurality of modulated digital audio sources, 22, 24, and 26, a plurality of receivers, 34, 36, and 38, a master controller 40, and an unmodulated serial data sink 42. During operation, modulated digital audio source 22 is connected to receiver 34 via a Modulated Digital Data bus 28. Similarly, modulated digital audio source 24 is connected to receiver 36 via a Modulated Digital Data bus 30 and modulated audio source 26 is connected to receiver 38 via a Modulated Digital Data bus 32. In the preferred embodiment of the invention, a digital signal processor may be used to implement both master controller 40 and unmodulated serial data sink 42.

Each of Receivers 34 through 36 is implemented in accordance with the present invention to provide a Lock signal to master controller 40. Additionally, master controller 40 provides a respective one of a plurality of Enable Control signals to an ROE input of each of receivers, 34, 36, and 38. To determine which one of receivers, 34, 36, and 38, should be a master of system 20, master controller 40 first asserts the ROE input of receiver 34 to test the Lock output. If the Lock output is asserted, master controller 40 continues to assert the ROE input to enable receiver 34 to be the master receiver of system 20. If the Lock output of receiver 34 is not asserted, master controller individually tests each of the remaining plurality of receivers, 36 and 38, to determine if the Lock output is asserted.

The RFS outputs of each of the plurality of receivers, 34, 36, and 38, are each connected to a Frame Sync input of unmodulated serial data sink 42. Additionally, the RFS outputs of each of receivers, 34, 36, and 38, are connected to the RSI input of receiver 34.

The RNS signals output by receivers, 34, 36, and 38, are each provided to a SCI (Serial Communication Interface) SYNC input of unmodulated serial data sink 42. Similarly, the RBS signals output by receivers, 34, 36, and 38, are each provided to a Block Sync input of data sink 42. In other implementations of the invention, the RBS signals may be provided to either an interrupt input pin or a general purpose input pin to accomplish the same function. Additionally, each of receivers, 34, 36, and 38, outputs serial data to an Unmodulated Data input of data sink 42 via an Unmodulated Data bus 35. The serial data is provided from a respective one of the plurality of outputs collectively referred to as Data in each of the plurality of receivers, 34, 36, and 38. Unmodulated Data bus 35 provides a plurality of conductors to transfer both audio and non-audio information. The PCK output of each of receivers, 34, 36, and 38, are each connected to a Clock input of data sink 42. Additionally, the PCK output of receiver 34 is connected to the CK input of receiver 34. Similarly, the PCK outputs of receivers 36 and 38 are each respectively connected to their own CK inputs. The RSO output of receiver 34 is connected to the RSI input of receiver 36. Similarly, the RSO output of receiver 36 is connected to the RSI input of receiver 38.

During operation of a digital audio system as shown in FIG. 1 in which a single receiver is implemented, the CK input of receiver 14 is provided by either data sink 16 or by the PCK output of receiver 14. The PCK output provides the programmed clock signal which may be used as a serial interface bit clock. Any on-chip oscillator (not shown) may be selected as the clock source. For example, a voltage controlled oscillator (VCO) controlled by an on-chip phase lock loop (PLL) circuit may also be used as the clock source. The output of the oscillator may then be modified by an on-chip programmable clock generator (not shown) which is controlled by a user of system 10. The output of the oscillator may be modified to provide either a faster or a slower frequency. For reasons which will become clearer later, the PCK output is in a high impedance state when the ROE signal is negated.

The Lock signal indicates whether a phase lock loop circuit (not shown) in receiver 14 has locked to a sampling frequency of the incoming audio data signal provided by modulated digital audio source 12 via an audio data conductor of Modulated Digital Data bus 13. The Lock signal is asserted when receiver 14 has locked to the incoming digital audio signal and is in a high impedance state when the ROE signal is negated.

The RBS signal is asserted during a last frame period of each receive block period to indicate an end of a block of digital audio data. Any transition in the state of the RBS signal is performed in synchrony with a transition of the CK signal. Like the PCK and Lock signals, the RBS signal is in a high impedance state when the ROE signal is negated.

The RFS signal is asserted during the last clock period of each receive sample period or frame of digital data. The RFS signal is synchronized with the CK signal and changes on a sampling edge of the CK signal. Again, the RFS signal is in a high impedance state when the ROE signal is negated.

The RSI signal is asserted for one clock period of the programmed clock signal to begin a receive data transfer. The first data bit is provided by the audio conductor of Unmodulated Data bus 13 to data sink 16 one clock period of the programmed clock signal after the RSI signal is asserted. For a single receiver as shown in FIG. 1, the RSI signal is connected to RFS. In digital audio systems with multiple receivers, the RSI signal is connected to the RFS input of a master device to occupy a first receive time slot or to the RSO output of the serial device occupying a previous receive time slot. Systems having both single and multiple receivers will be subsequently discussed in more detail. RSI is synchronous to the programmed clock signal.

The RSO signal is asserted for one period of the programmed clock signal in each frame of digital data. The RSO output follows the RSI signal by a fixed number of periods of the programmed clock signal depending on a mode of operation of the device. For a single receiver, the RSO output is typically not connected to another device. However, for digital audio systems having multiple receivers, the RSI input is connected to the RSO output to form a daisy-chain which defines receive data time slots for each digital audio source. In a receive daisy chain, the RSO output is typically connected to the RSI input of the serial device occupying the following receive time slot. Again, systems having both single and multiple receivers will be subsequently discussed in more detail. Like the RSI signal, the RSO signal is synchronous to the programmed clock signal.

The RNS signal is a gated clock output which is used to transfer non-audio data at a slower rate than its associated audio data. The non-audio data has eight bits per sample period. The non-audio data is transferred to unmodulated serial data sink 16 via a non-audio conductor of Unmodulated Data bus 15. The RNS output is in a high impedance state until the RSI signal is asserted. When the RSI signal is asserted, the RNS signal is asserted in synchrony to the next non-sampling edge of the programmed clock signal. The RNS signal is asserted until ten CK cycles before RSO is asserted. At that point, the RNS signal transitions to a high impedance state in synchrony to the next non-sampling edge of the programmed clock signal. RNS has eight active low clock pulses per frame wherein each pulse has a width of one or two clock pulses provided by the programmed clock signal and a clock period of two or four pulses provided by the programmed clock signal depending on a mode of operation for transferring the digital data serially. RNS is used to directly interface non-audio data to data sink 16.

Although not described in detail herein, non-audio data is not necessarily provided in accordance with the timing signals provided by the RNS output. The non-audio data may be provided by the same pin which provides the audio data. In such a situation, the same CK signal used to provide both the audio data and the non-audio data.

The ROE signal is asserted to enable the RBS and RFS outputs, the Lock output, and the PCK output of an interface receiver. When not enabled by the ROE signal, each of the RBS, RFS, Lock, and PCK outputs are in a high impedance state. For a single receiver, the ROE signal is always asserted. For multiple receivers, the ROE is asserted to select which serial device provides master CK and RFS signals to the remaining portion of the receivers. The RBS signal of the master receiver is provided to the Block Sync input of unmodulated serial data sink 42.

Figure 3:
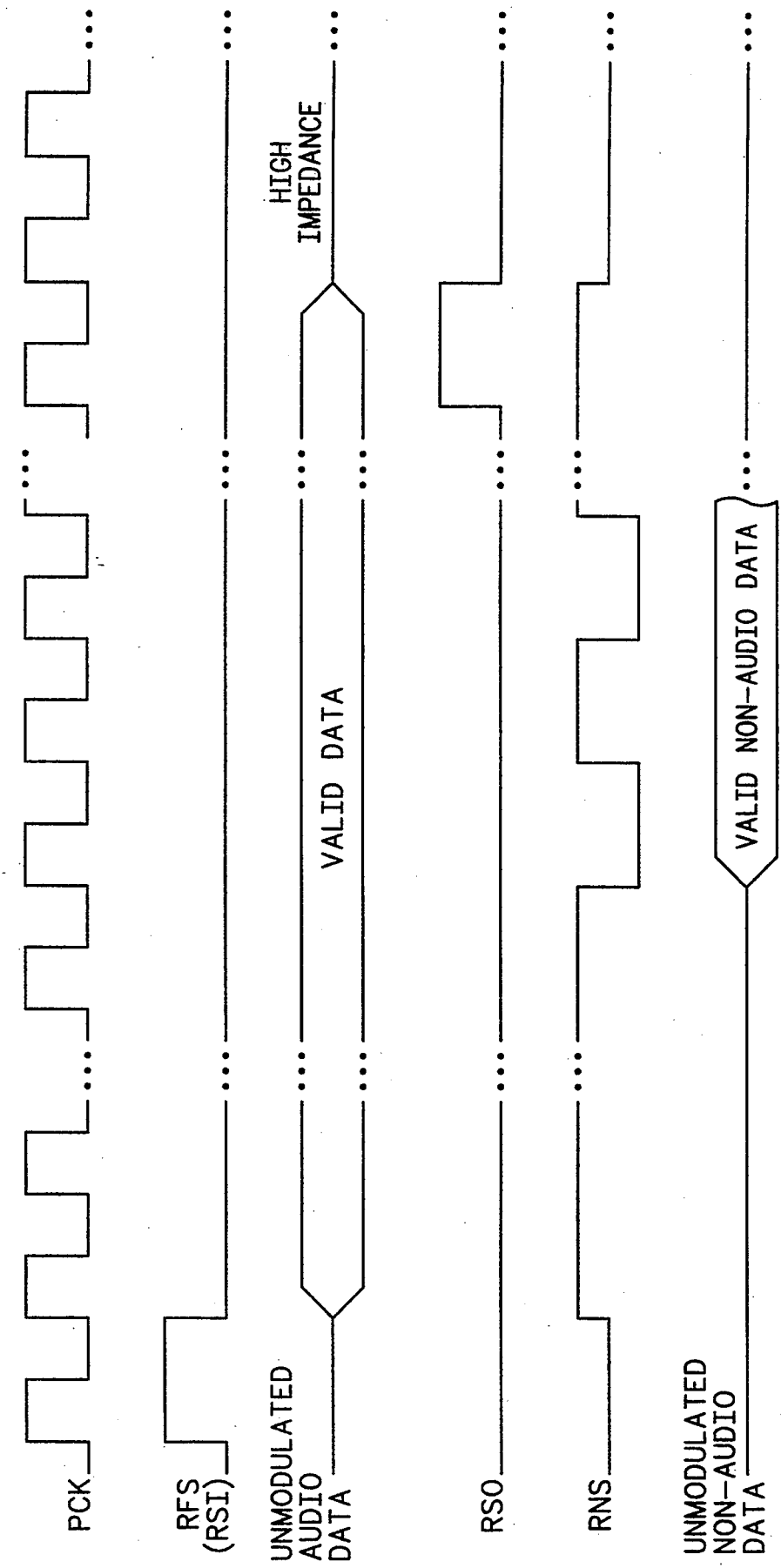
FIG. 3 illustrates in timing diagram form the timing signals provided by the interface receiver of FIG. 1 during operation.

FIG. 3 illustrates a timing diagram illustrating the inter-relationship of each of these signals in a single receiver system as shown in FIG. 1. In FIG. 3, a clock signal is provided by the PCK output of receiver 14. On the non-sampling edge of a first pulse of the clock signal, the RFS signal is asserted for one clock period. In this implementation, the RFS signal is connected to the RSI input of receiver 14. On the falling edge of the RSI signal, digital audio data is provided to unmodulated serial data sink 16 via the audio conductor of Unmodulated Data bus 15. Before the falling edge of the RSI signal, the Unmodulated Data output is in a state of high impedance. The RSO signal is asserted a predetermined number of clock cycles after assertion of the RSI signal. On the falling edge of the RSO signal, data is no longer transferred via the Unmodulated Data Bus 15. Concurrently, the RNS signal is asserted on the falling edge of the RSI signal. When the RNS signal is asserted, digital unmodulated non-audio data is transferred at a slower frequency than the sampling frequency of the digital audio data. As was previously mentioned, the digital audio data is transferred via the audio conductor of Unmodulated Data bus 15 and the digital non-audio data is transferred via the non-audio conductor of Unmodulated Data bus 15. The RNS signal provides timing signals to gate the digital non-audio data to data sink 16 until ten PCK cycles before the falling edge of the RSO signal. At that point, the RNS returns to a high impedance state and no longer provides the timing signals necessary to transfer the digital non-audio data. The ten clock cycles are chosen in accordance with the timing and design of the system and may be modified to reflect characteristics of another system.

Although not shown herein, the ROE signal is asserted during operation of receiver 14. Additionally, the Lock signal is asserted to indicate that receiver 14 is locked to the incoming digital audio signal. The RBS signal is asserted at the beginning of the transfer of the block of digital audio data to indicate the start of the block of data.

Whereas FIG. 3 describes the signals input and output by a single receiver, multiple receivers may be configured in a daisy chain such that multiple digital audio sources may provide digital audio data to a serial data sink. As was previously mentioned, the daisy chain configuration implementation having multiple receivers is illustrated in FIG. 2.

During operation, each of the modulated digital audio sources, 22, 24, and 26, are synchronized to provide digital data in synchrony with one another. Additionally, each of the plurality of receivers, 34, 36, and 38, is provided a clock input by a same clock signal such that the serial interfaces of each of the plurality of receivers, 34, 36, and 38, operates synchronously with respect to each other.

When each of the plurality of receivers, 34, 36, and 38, receive digital audio data via the Modulated Digital Data busses 28, 30, and 32 respectively, one of the plurality of receivers locks to a frequency of an incoming digital audio data signal. The receiver which locks to the frequency is referred to as a master receiver. All other receivers are referred to as slave receivers. When the master receiver locks to the digital audio data signal, the Lock signal of the master receiver is asserted and is provided to master controller 40. Master controller 40 subsequently provides the Enable Control signal which asserts the ROE signal of the master receiver. Only one ROE input may be asserted at a time. Therefore, the ROE signal of each of the slave receivers is negated.

When the ROE signal of the master receiver is asserted, the PCK (the programmable clock) output is enabled to provide a programmed clock signal in accordance with a pre-programmed frequency. The programmed clock signal of the master receiver is then provided to the CK (clock) input of itself as well as the CK inputs of the slave receivers. Additionally, the programmed clock signal is provided to a Clock input of unmodulated serial data sink 42. The PCK outputs of the slave receivers are in a high impedance state and do not provide the programmed clock signal because the ROE signals of those receivers are negated. As was previously described, when the ROE input is negated, the PCK output has a high impedance state.

Assume during the following discussion, that receiver 34 asserts its Lock signal and is selected by master controller 40 as the master receiver. Master controller 40 selects receiver 34 as the master receiver by asserting the ROE input of receiver 34. As was previously discussed, when the ROE input is asserted, the RBS and PCK outputs are enabled to respectively provide a block synchronization signal and the programmed clock signal. Master receiver 34 is first enabled to provide a clock frequency to each of the slave receivers such that the digital audio and non-audio data will be transmitted to unmodulated serial data sink 42 synchronously. Additionally, the master receiver asserts an RBS output to provide a block sync signal indicating a beginning of a block of digital audio data. The block sync signal is also provided to the Block Sync input of unmodulated serial data sink 42. The RBS output of the slave receivers (36 and 38) are in a high impedance state because the ROE signals of each of receiver 36 and 38 are negated.

Master receiver 34 asserts an RFS output to indicate a beginning of a frame of digital audio and non-audio data. The RFS output is asserted for one programmed clock period. The RFS output of master receiver 34 is connected to both the Frame Sync input of unmodulated serial data sink 42 and its own RSI input. The RFS outputs of each of the remaining ones of the plurality of receivers (36 and 38) are in a high impedance state to reflect that another receiver is the master of the system. When master receiver 34 asserts its RFS output, master receiver 34 indicates a beginning of the transfer of digital audio data to serial data sink 42 from one of the plurality of receivers, 34, 36, and 38, during each frame period.

On the falling edge of the RFS signal, master receiver 34 serially provides digital audio data to the unmodulated data input of unmodulated serial data sink 42 via an audio conductor of Unmodulated data bus 35. Note, that in the example of master receiver 34, the RFS output is connected to the RSI input. Therefore, an equally true statement would be that master receiver 34 serially provides the digital audio data to the unmodulated data input of unmodulated serial data sink 42 one clock period after assertion of the RSI input. The Data output of both slave receivers 36 and 38 are not enabled to provide digital audio data until the respective RSI input of slave receiver 36 and 38 is enabled. Until the point in time in which the RSI input is asserted, the Data output is in a high impedance state and no data is transmitted.

Additionally, on the falling edge of the RFS signal, master receiver 34 serially provides digital non-audio data from the RNS output to the SCI Sync input of serial data sink 42 via a non-audio conductor of Unmodulated Data bus 35. Both the RNS and RSI outputs are enabled such that digital non-audio and audio data is provided to serial data sink 42 via Unmodulated Data bus 35 until the falling edge of the synchronization output signal provided by the RSO output of master receiver 34. As was previously mentioned, the RSO output of any receiver in this implementation of the invention is asserted a predetermined number of clock periods after the RSI input is asserted. Additionally, in some situations, non-audio data is not necessarily provided in accordance with the timing signals provided by the RNS output. The non-audio data may be provided by the same pin which provides the audio data. In such a situation, the same CK signal used to provide both the audio data and the non-audio data. Therefore, on the falling edge of the synchronization output signal provided by the RSO output of master receiver 34, transmission of digital audio data is terminated. Subsequently, the Data output of master receiver 34 has a high impedance state. Ten CK cycles before assertion of the RSO output, the RNS output is placed in a high logic state and transmission of digital non-audio data is terminated. On the falling edge of the RSO output, the RNS output is placed in a high impedance state. Again, the Data output provides both digital audio and non-audio data.

Because the RSO output of master receiver 34 is connected to the RSI input of slave receiver 36, the RSI input of slave receiver 36 is asserted concurrently with the termination of the transfer of digital audio and non-audio data by master receiver 34. On the falling edge of the signal which is output by the RSO of master receiver 34 and is input to the RSI input of slave receiver 36, digital audio data is provided by the Data output of receiver 36 to unmodulated serial data sink 42 via the audio conductor of Unmodulated Data bus 35. Additionally, digital non-audio data is provided concurrently to data sink 42 via the non-audio conductor of Unmodulated Data bus 35 in accordance with the timing signals provided via the RNS output of slave receiver 36. Again, a predetermined number of clock periods after the RSI input of slave receiver 36 is asserted, the RSO output of slave receiver 36 is asserted to indicate an end of a transfer of digital audio and non-audio data from slave receiver 36 to unmodulated serial data sink 42.

Subsequently, the RSO of slave receiver 36 is provided to slave receiver 38 to indicate that slave receiver 38 may begin to transfer digital audio and non-audio data to unmodulated serial data sink 42 via Unmodulated Data bus 35. This process may be repeated for any number of receivers as long as the frequency of the programmed clock signal provided by master receiver 34 is high enough to transfer the necessary digital data during a frame period.

Figure 4:
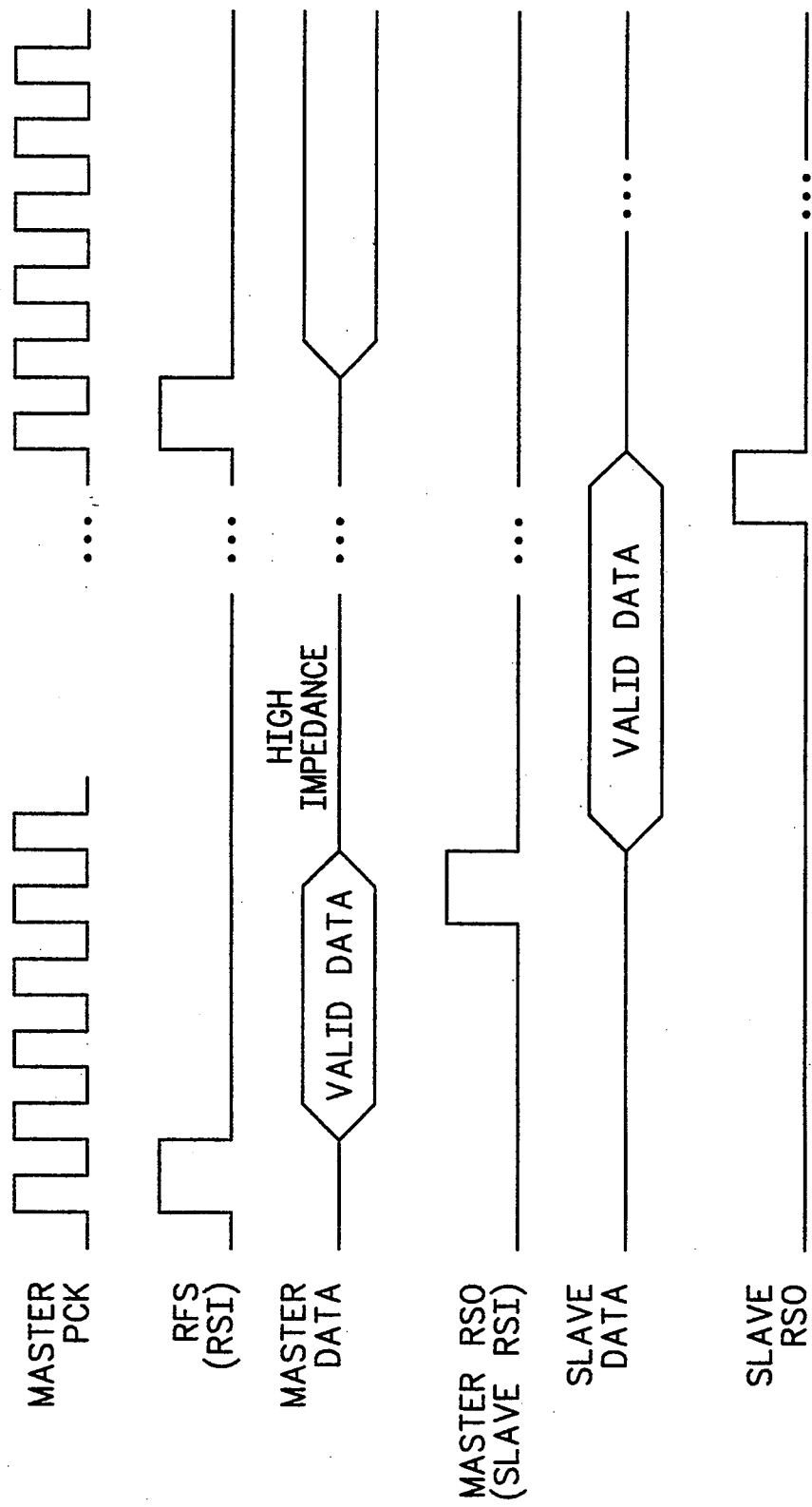
FIG. 4 illustrates in timing diagram form the timing signals provided by the communications system of FIG. 2.

FIG. 4 provides a timing diagram illustrating the daisy chain configuration described above. In quick summary of the figure, a clock signal is provided by the PCK output of receiver 34. On the non-sampling edge of a first pulse of the clock signal, the RFS signal is asserted for one clock period. In this implementation, the RFS signal is connected to the RSI input of receiver 34. On the falling edge of the RSI signal, receiver 34 provides digital audio data to unmodulated serial data source 42 via the unmodulated audio data conductor of Unmodulated Data bus 35. Before the failing edge of the RSI signal, the unmodulated audio data conductor is in a state of high impedance. The RSO signal is asserted a predetermined number of clock cycles from the assertion of the RSI signal. On the falling edge of the RSO signal, data is no longer transferred via the unmodulated audio data conductor of Unmodulated Data bus 35.

Concurrently, the RNS signal is asserted on the falling edge of the RSI signal. As was previously mentioned, when the RNS signal is asserted, digital non-audio data is transferred at a slower frequency than the sampling frequency of the digital data transferred via the unmodulated non-audio conductor of Unmodulated Data bus 35. The RNS signal provides the timing signals to transfer digital non-audio data to data sink 42 until the ten CK cycles before the falling edge of the RSO signal. At that point, the RNS returns to a high logic state.

The RSO output of master receiver 34 is tied to the RSI input of slave receiver 36. Therefore, when the RSO of master receiver 34 is asserted, the RSI input of slave receiver 36 is also asserted. Subsequently, digital audio data is provided to data sink 42 by slave receiver 36 until the RSO output of slave receiver 36 is negated. On the falling edge of the RSO output, the Data output of receiver 36 is put in a high impedance state and data is no longer transferred by receiver 36. Concurrently, the RNS signal of slave receiver 36 is asserted on the falling edge of the slave RSI signal. Digital non-audio data is provided to data sink 42 until ten cycles before the falling edge of the RSO signal. At that point, the RNS returns to a high logic state and digital non-audio data is no longer provided to data sink 42.

Additionally, when the RSO output of receiver 36 is asserted, the RSI input of receiver 38 is concurrently asserted. Therefore, receiver 38 is enabled to transfer digital audio data to data sink 42 until the RSO output of receiver 38 is negated. As many receivers as may provide data during a predetermined clock period may be configured in the daisy-chain configuration illustrated in FIG. 2.

Although not shown herein, the Lock output of receiver 34 is asserted during operation while the Lock outputs of both receiver 36 and receiver 38 are tristated. The ROE input of receiver 34 is asserted during operation while the ROE inputs of both receivers 36 and 38 are negated. Additionally, the RBS signal of receiver 34 is asserted during a last frame of a previous block to indicate the start of the block of data.

The master of the digital audio communications system 20 may be modified at any time during operation. To modify the master of the system, master receiver 34 would lose lock on the incoming digital signal and negate the Lock output. Therefore, the ROE of master receiver 34 would be negated and each of the Lock, RFS, and PCK outputs would be in a high impedance state. A receiver would then lock to the frequency of the digital data stream and assert its Lock output to function as a new master receiver. The new master receiver then provides a clock frequency to each of the remaining plurality of receivers in the daisy chain configuration to maintain synchronicity. The RFS and RBS outputs of the new master receiver will drive the Frame Sync and Block Sync inputs of unmodulated serial data sink 42, respectively.

Although the master of the digital audio communication system 20 may change from receiver to receiver within the system, an order in which each of the receivers provides data to unmodulated serial data sink 42 remains the same. For example, even if receiver 38 was a master receiver, receiver 34 should still provide digital audio and non-audio data to unmodulated serial data sink 42 first. The digital audio data from receiver 34 would then be followed by digital audio data from receiver 36. Subsequently, receiver 38 would provide the digital audio data after receiver 36. Receiver 38 would be the master receiver in the sense that all of the receivers were synchronized to the clock signal provided by the PCK output of receiver 38. Additionally, the unmodulated serial data sink 42 would be synchronized to the RBS and RFS outputs of receiver 38.

The master of digital audio communication system 20 would most likely be modified to reflect a difference in the frequency of the modulated digital data provided by the plurality of modulated digital audio sources, 22, 24, and 26. For example, each of the plurality of receivers, 34, 35, and 38, may be tuned to lock at a different frequency. Depending on the modulated digital data to be transmitted, different frequencies may be provided to the plurality of receivers, 34, 36, and 38. Typically, knowledge of that frequency is not known a priori. Master controller 40 allows a user of communications system 20 to easily change the master receiver of communication system 20 to reflect a different frequency of an incoming modulated digital data signal.

Such flexibility is advantageous for any user of system 20. Signals of different frequencies may be provided with no rewiring of circuits or complex programming. Rather, master controller 40 and each of the plurality of receivers works together to provide digital audio data to unmodulated serial data sink 42 as quickly as possible.

Additionally, in digital audio communication system 20, the non-audio data is also concurrently provided to the SCI data input of serial data sink 42 using the daisy chain technique described above.

Figure 5:
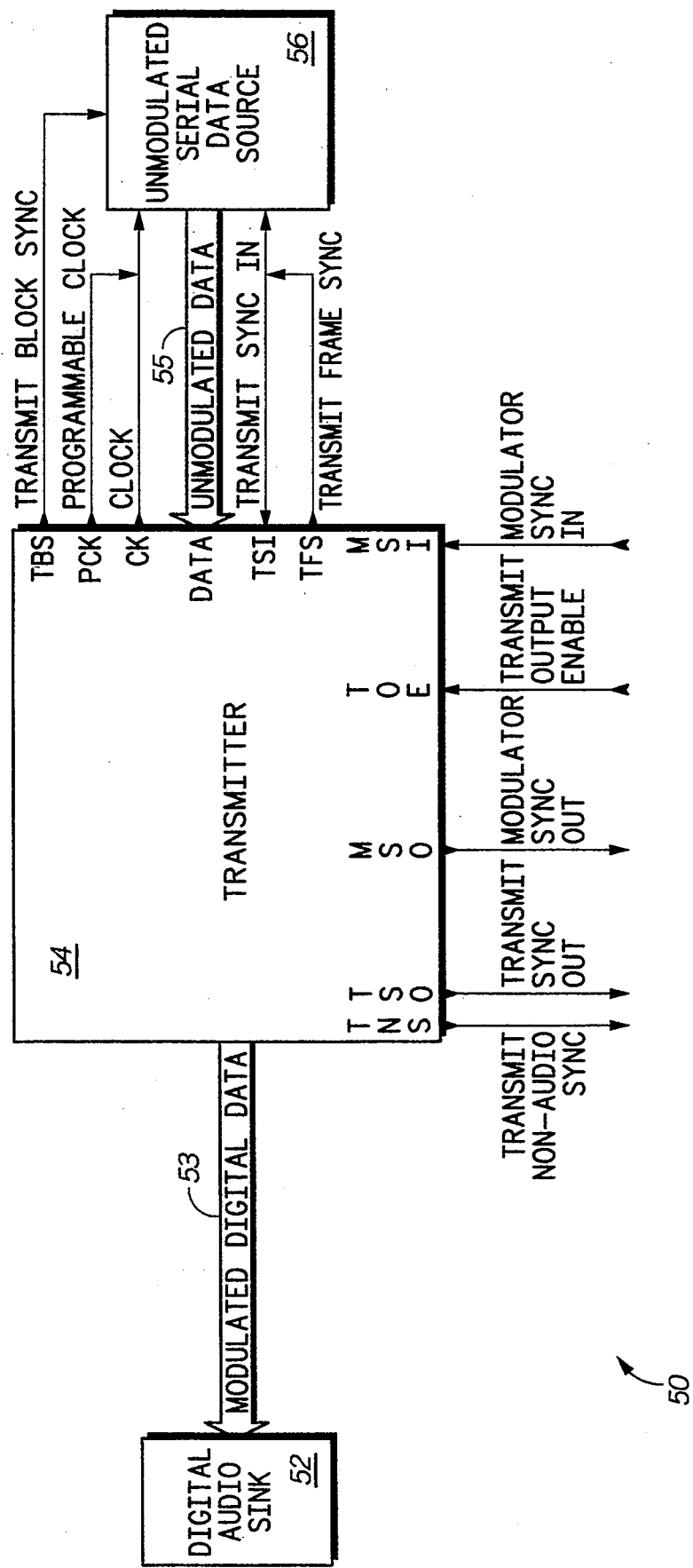
FIG. 5 illustrates in a block diagram form a communications system for transferring digital audio information from a storage circuit to a digital audio sink in accordance with the present invention.

FIG. 5 illustrates a second embodiment of the invention in a digital audio communication system 50. Communication system 50 includes a digital audio sink 52, a transmitter 54, and an unmodulated serial data source 56. As an example, modulated digital audio sink 52 may be implemented as a piece of musical recording equipment. Additionally, unmodulated serial data source 56 may be implemented as a digital signal processor or an A-D converter in some implementations of the invention.

Modulated digital audio sink 52 is connected to transmitter 54 via a Modulated Digital Data bus 53 to receive digital audio data. Transmitter 54 has a first output for providing a Transmit Non-audio Sync (TNS) signal, a second output for providing a Transmit Sync Out (TSO) signal, and a third output for providing a Modulator Sync Out (MSO) signal. The first, second, and third outputs are respectively referred to as the TNS, TSO, and MSO outputs of transmitter 54. A Modulator Sync In (MSI) signal is provided to a MSI input of transmitter 54 by an external source (not shown herein).

Transmitter 54 is coupled to unmodulated serial data source 16 to communicate a plurality of digital data and control signals. An Unmodulated Data bus 55 provides digital audio information from unmodulated serial data source 56 to transmitter 54. Unmodulated Data bus 55 includes a plurality of conductors for transferring digital audio and non-audio data. Transmitter 54 provides a Transmit Block Sync (TBS) signal to unmodulated serial data source 56 via a TBS output. An output of transmitter 54 labeled "PCK" also provides a programmed clock signal to unmodulated serial data source 56 and to the CK input of transmitter 54. Transmitter 54 also provides a Transmit Sync In (TSI) signal to unmodulated serial data source 56. A Transmit Frame Sync (TFS) signal provided by transmitter 54 is also connected to the TSI input. Additionally, a Transmit Output Enable (TOE) signal is provided to a TOE input of transmitter 54. The TOE signal is a control signal which may be provided by an external master controller (not shown in FIG. 5) or even unmodulated serial data source 56.

Figure 6:
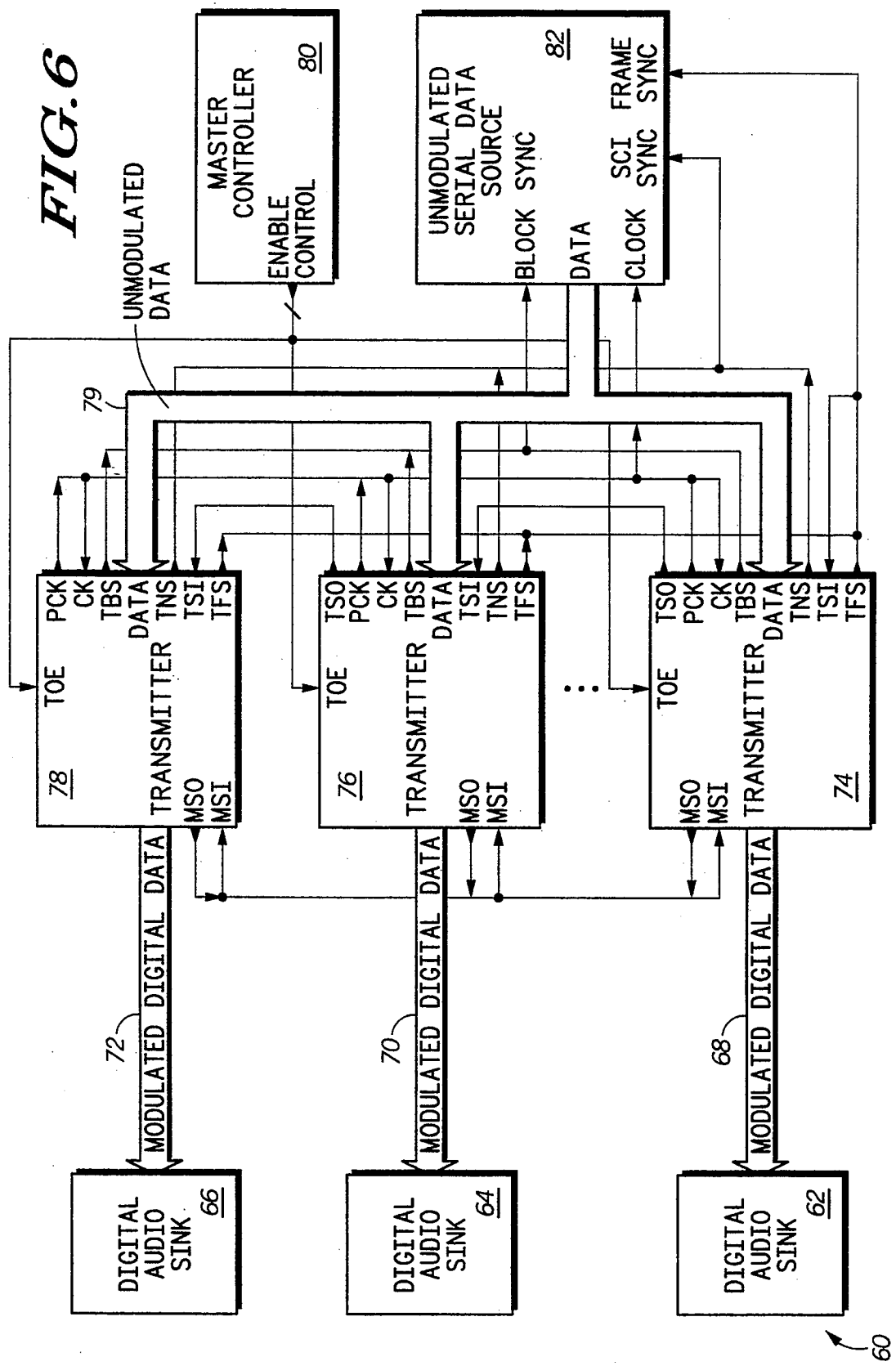
FIG. 6 illustrates in block diagram form a communications system having multiple transmitters in a "daisy-chain" configuration.

FIG. 6 illustrates a digital audio system 60 which is configured in a daisy chain. In the daisy chain configuration, digital audio system 60 includes a plurality of digital audio sinks 62, 64, and 66, a plurality of transmitters, 74, 76, and 78, a master controller 80, and an unmodulated serial data source 82. During operation, modulated digital audio sink 62 is connected to transmitter 74 via a Modulated Digital Data bus 68. Similarly, modulated digital audio sink 64 is connected to transmitter 76 via a Modulated Digital Data bus 70 and modulated digital audio sink 66 is connected to transmitter 78 via a Modulated Digital Data bus 72.

Master controller 80 provides an Enable Control signal to an TOE input of each of transmitters, 74, 76, and 78. Master controller 80 provides the Enable Control signal to one of the plurality of transmitters which has an appropriate clock frequency for transmitting digital data. For example, only one of the plurality of transmitters may have a 44.1 KHz transmit crystal necessary for proper transmission of data to the plurality of digital audio sinks. The TFS outputs of each of the plurality of transmitters, 74, 76, and 78, are each connected to the Frame Sync input of unmodulated serial data source 82. Additionally, the TFS output of transmitter 74 is connected to the TSI input of transmitter 74.

The TNS signals output by transmitters, 74, 76, and 78, are each provided to a SCI (Serial Communication Interface) input of unmodulated serial data source 82. Similarly, the TBS signals output by transmitters, 74, 76, and 78, are each provided to a Block Sync input of data source 82. Additionally, each of transmitters, 74, 76, and 78, receive serial audio and non-audio data from a Data output of data source 82 via an Unmodulated Data bus 79. The PCK outputs of each of transmitters, 74, 76, and 78, are each connected to a Clock input of data source 82 to provide a programmed clock signal. Additionally, the PCK output of transmitter 74 is connected to the CK input of transmitter 74. Similarly, the PCK outputs of transmitters 76 and 78 are each respectively connected to their own CK inputs. The TSO output of transmitter 74 is connected to the TSI input of transmitter 76. Similarly, the TSO output of transmitter 76 is connected to the TSI input of transmitter 78. Additionally, the MSO output of each of the plurality of transmitters, 74, 76, and 78, are connected to the MSI inputs of each of the plurality of transmitters, 74, 76, and 78.

During operation of a digital audio system as shown in FIG. 5, the CK input of transmitter 54 is provided by an oscillator (not shown) or by the PCK output of transmitter 54. The programmable clock signal provided by the PCK output is a system clock which may be used as a serial interface bit clock. Any on-chip oscillator (not shown) may be selected as the clock source. The frequency of the oscillator may then be modified by an on-chip programmable clock generator (not shown) which is controlled by a user of system 10. For reasons which will become clearer later, the PCK output is high impedance when the TOE signal is asserted.

The MSO signal is used to indicate a start of a frame of digital audio information which may be used to synchronize multiple transmitters in an audio communication system. The MSO signal is asserted for one CK period during the transmission of a first preamble of a first subframe of digital audio data. For a single transmitter, the MSO output is typically not connected to an input of another device. For multiple, time-synchronized transmitters, the MSO outputs of each of the transmitters are typically connected to the MSI inputs of all of the transmitters in the communication system. The MSO output is in a high impedance state when the TOE signal is asserted.

The MSI signal is used to reset a state machine (not shown) of a transmitter at a start of a frame of digital audio information. The MSI input is asserted for one oscillator period of an internal clock of one of the plurality of transmitters, 74, 76, and 78, for each frame of transmitted digital audio data. For a single device, the MSI input is typically negated. For multiple, time-synchronized transmitters, MSI is typically connected to the MSO output of a master transmitter. If MSI is asserted before MSO is asserted, the current frame of transmitted digital audio information is truncated and a new frame of transmitted digital audio information is started.

The TBS signal is asserted during a last frame period of each transmit block period to indicate an end of a block of digital audio data. The first frame of digital audio data in the block is received from unmodulated serial data source 56 in a frame period following the assertion of the TBS signal. Any transition in the state of the TBS signal is performed in synchrony with a transition of the CK signal. Like the PCK and MSO signals, the TBS signal is in a high impedance state when the TOE signal is asserted.

The TFS signal is asserted during the last clock period of each transmit sample period or frame of digital data. The TFS signal is synchronized with the CK signal and changes on a non-sampling edge of the CK signal. Again, the TFS signal is in a high impedance state when the TOE signal is asserted.

The TSI signal is asserted for one period of the CK signal for each transmit sample period to begin a transmit data transfer. The first data bit is provided from data source 82 via an audio conductor of Unmodulated Data bus 79 one period of the CK signal after the TSI signal is asserted. For a single transmitter as shown in FIG. 5, the TSI signal is connected to TFS and is synchronous to the CK signal. Although not described in detail herein, the TSI signal may also be fed by a frame synchronization signal provided by serial data source. When the TFS signal is not provided to the TSI input, the TSI and MSI signals are clocked by the same signal to insure internal synchronization. In digital audio systems with multiple transmitters, the TSI signal is connected to the TFS output of a master device to occupy a first transmit time slot or to the TSO input of the serial device occupying a previous transmit time slot. Systems having both single and multiple transmitters will be subsequently discussed in more detail. Again, TSI is synchronous to the CK signal.

The TSO signal is asserted for one period of the CK signal in each frame of digital data. The TSO signal follows the TSI signal by a fixed number of clock periods of the CK signal depending on a mode of operation of the device. For a single transmitter, the TSO signal is typically not connected to another device. However, for digital audio systems having multiple transmitters, the TSI and TSO signals are connected together to form a daisy-chain which defines transmit data time slots for each digital audio sink. In a transmit daisy chain, the TSO signal is typically connected to the TSI input of the serial device occupying the following transmit time slot. Again, systems having both single and multiple transmitters will be subsequently discussed in more detail. Like the TSI signal, the TSO signal is synchronous to the CK signal.

The TNS output is a gated clock output which is used to transmit non-audio data at a slower rate than its associated audio data. The non-audio data has eight bits per sample period and is transferred via a non-audio conductor of Unmodulated Data bus 55. The TNS signal is in a high impedance state until the TSI signal is asserted. When the TSI signal is asserted, the TNS signal is asserted in synchrony to the next non-sampling edge of the CK signal. The TNS signal is asserted until TSO is asserted. At that point, the TNS signal transitions to a high impedance state in synchrony to the next non-sampling edge of the CK signal. TNS has eight active low clock pulses per frame wherein each pulse has a width of one or two clock pulses provided by the CK signal and a clock period of two or four pulses provided by the CK signal depending on a mode of operation for transferring the digital data serially. The TNS output is used to directly interface non-audio data to data source 82.

Although not described in detail herein, non-audio data is not necessarily received in accordance with the timing signals provided by the TNS output. The non-audio data may be received on the same pin which receives the audio data. In such a situation, the same CK signal used to receive both the audio and non-audio data.

The TOE signal is asserted to enable the TBS, TFS, the MSO, and the PCK outputs of a transmitter. When not enabled by the TOE signal, each of the TBS, TFS, MSO, and PCK outputs are in a high impedance state. For a single transmitter, the TOE signal is always asserted. For multiple transmitters, the TOE is asserted to select which serial device provides master PCK, TBS, and TFS signals to the remaining portion of the transmitters.

Figure 7:
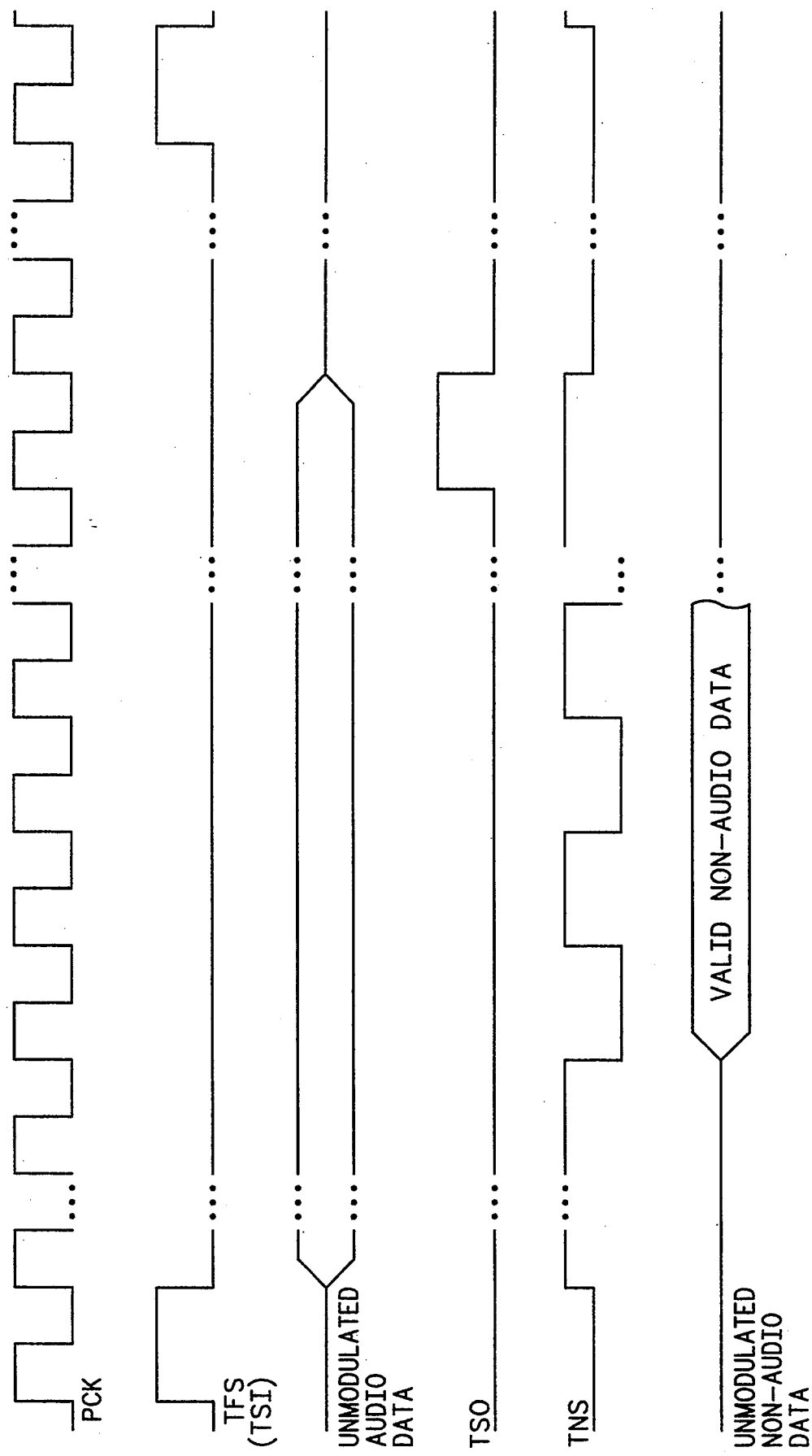
FIG. 7 illustrates in timing diagram form the timing signals provided by the interface transmitter of FIG. 5 during operation.

FIG. 7 illustrates a timing diagram illustrating the relationship between each of these signal in a single transmitter system as shown in FIG. 5. In FIG. 7, a clock signal is provided by the PCK output of transmitter 54. On the sampling edge of a first pulse of the clock signal, the TFS signal is asserted for one clock period. In this implementation, the TFS signal is provided to the TSI input of transmitter 54. On the falling edge of the TSI signal, transmitter 54 receives digital audio data from unmodulated serial data sink 56 via an audio conductor of Unmodulated Data bus 55. Before the falling edge of the TSI signal, the audio conductor of Unmodulated Data bus 55 is in a state of high impedance. The TSO signal is asserted a predetermined number of clock cycles from the assertion of the TFS signal. On the falling edge of the TSO signal, data is no longer transferred via the audio conductor of Unmodulated Data bus 55. Concurrently, the TNS signal is asserted on the falling edge of the TSI signal. As was previously mentioned, when the TNS signal is asserted, digital non-audio data is transferred at a slower frequency than the sampling frequency of the digital data transferred via the non-audio conductor of Unmodulated Data bus 55. The TNS signal enables transmitter to receive the digital non-audio data from data source 56 until ten PCK clock cycles before the falling edge of the TSO signal. The TNS returns to a high impedance state on the falling edge of the TSO signal.

Although not shown herein, the TOE signal is asserted during operation of transmitter 54. Additionally, the TBS signal is asserted at the end of the transfer of a previous block of digital audio data to indicate the start of a next block of data. The MSI signal is tied low in this implementation of the invention. Similarly, the MSO output is not connected to an external device as this is an implementation of a single transmitter which does not require synchronization with other transmitters.

Whereas FIG. 7 describes the signals input and output by a single transmitter, multiple transmitters may be configured in a daisy chain such that a digital audio sources may provide digital audio data to a plurality of serial data sinks. As was previously mentioned, the daisy chain configuration implementation having multiple transmitters is illustrated in FIG. 6.

During operation, each of the plurality of transmitters, 74, 76, and 78, are synchronized to transmit digital data in synchrony with one another. To transmit digital data synchronously, each of the plurality of transmitters, 74, 76, and 78, is provided a clock input by a same clock signal such that each of the plurality of transmitters, 74, 76, and 78, operates synchronously with respect to the other ones of the plurality of transmitters.

When each of the plurality of transmitters, 74, 76, and 78, transmit digital data via the Modulated Digital Data busses 68, 70, and 72 respectively, one of the plurality of transmitters is designated as a master transmitter by master controller 80. All other transmitters are referred to as slave transmitters. Master controller 80 provides the Enable Control signal which asserts the TOE signal of the master transmitter. Only one TOE input may be asserted at a time. Therefore, the TOE signals of each of the remaining ones of the plurality of transmitters, the slave transmitters, are negated.

When the TOE signal of the master transmitter is asserted, the PCK (the programmable clock) output is enabled to provide a programmed clock signal in accordance with a pre-programmed frequency. The programmed clock signal of the master transmitter is then provided to the CK (clock) input of itself as well as the CK inputs of the slave transmitters. Additionally, in this implementation of the invention, the programmed clock signal is provided to a Clock input of unmodulated serial data source 82. Unmodulated serial data source 82 might also receive a clock input from an external source. The PCK outputs of the slave transmitters are in a high impedance state and do not provide a programmed clock signal because the TOE signals of those transmitters are negated. As was previously described, when the TOE input of a transmitter is negated, the PCK output has a high impedance state.

Assume during the following discussion, that transmitter 74 was selected by master controller 80 as the master transmitter. Master transmitter 74 is first enabled to provide a clock frequency to each of the slave transmitters such that the digital data will be received from unmodulated serial data source 82 synchronously. Additionally, master transmitter 74 asserts an TBS output to provide a block sync signal indicating a beginning of a block of digital data. The block sync signal is also provided to the Block Sync input of unmodulated serial data source 82. Although, in this implementation of the invention, the Block Sync input is a distinct input of unmodulated serial data source 82, the Block sync input may also be implemented as an interrupt input or even as a general input. The TBS output of the slave transmitters (76 and 78) are in a high impedance state because the corresponding TOE signals are negated.

Master transmitter 74 asserts an TFS output to indicate a beginning of a frame of digital audio data. The TFS output is asserted for one programmed clock period. The TFS output of master transmitter 74 is connected to both the Frame Sync input of unmodulated serial data source 82 and its own TSI input. The TFS outputs of each of the remaining ones of the plurality of transmitters (76 and 78) are in a high impedance state to reflect that another transmitter is providing a frame synchronization signal to synchronize the digital audio data received from serial data source 82.

On the falling edge of the TFS signal, master transmitter 74 serially receives digital audio data from the unmodulated data output of unmodulated serial data source 82. As was previously mentioned, the digital audio data is transferred via the audio conductor of Unmodulated Data bus 79. The Data input of both slave transmitters 76 and 78 are not enabled to receive digital audio data until the respective TSI input of slave transmitter 76 and 78 is enabled. Until the point in time in which the TSI input is asserted, the Data input is in a high impedance state.

Additionally, on the falling edge of the TFS signal, master transmitter 74 enables the TNS outputs to synchronize the transfer of digital non-audio data from the Data output of serial data source 82 to the non-audio Data input of transmitter 74. As was previously mentioned, the digital non-audio data is transferred via the non-audio conductor of Unmodulated Data bus 79. The Data input is enabled to receive digital audio from serial data source 82 until the falling edge of the synchronization output signal provided by the TSO output of master transmitter 74. Similarly, non-audio data is received from serial data source 82 until ten PCK cycles before the falling edge of the synchronization output signal provided by the TSO output of master transmitter 74. As was previously mentioned, the TSO output of any transmitter in this implementation is asserted a predetermined number of clock periods after the TSI input is asserted. Additionally, on the falling edge of the synchronization output signal provided by the TSO output of master transmitter 74, transmission of digital audio data is terminated. Subsequently, both the Data input and the TNS output of master transmitter 74 have a high impedance state.

Because the TSO output of master transmitter 74 is connected to the TSI input of slave transmitter 76, the TSI input of slave transmitter 76 is asserted concurrently with the termination of the transfer of digital audio and non-audio data by master transmitter 74. On the falling edge of the TSO signal, which is provided by the TSO output of master transmitter 74 to the TSI input of slave transmitter 76, digital audio data is provided by the Unmodulated Data output of unmodulated serial data source 82 to the Data input of transmitter 76 via the audio conductor of Unmodulated Data bus 79. Additionally, digital non-audio data is concurrently received from data source 82 via the non-audio conductor of the Unmodulated Data bus 79. The digital non-audio data is received in accordance with the timing signals provided by the TNS signal. Again, a predetermined number of clock periods after the TSI input of slave transmitter 76 is asserted, the TSO output of slave transmitter 76 is asserted to indicate an end of a transfer of digital audio data from unmodulated serial data source 82 to slave transmitter 76. The transfer of digital non-audio data from unmodulated serial data source 82 to slave transmitter 76 is terminated ten PCK cycles before assertion of the TSO output.

Subsequently, the TSO signal output by slave transmitter 76 is provided to the TSI input of slave transmitter 78 to indicate that slave transmitter 78 may begin to communicate digital audio and non-audio data to unmodulated serial data source 82. This process may be repeated for any number of transmitters provided the frequency of the programmed clock signal provided by master transmitter 74 is high enough to transfer the necessary digital data during a period wherein the frame synchronization signal provided by the TFS output is negated.

In addition to the TFS signal, the master transmitter asserts its MSO output to indicate a start of a frame of modulated digital audio data. The MSO output is connected to the MSI input of each of the slave transmitters to synchronize each of the transmitters in communications system 60 to the same frequency.

Figure 8:
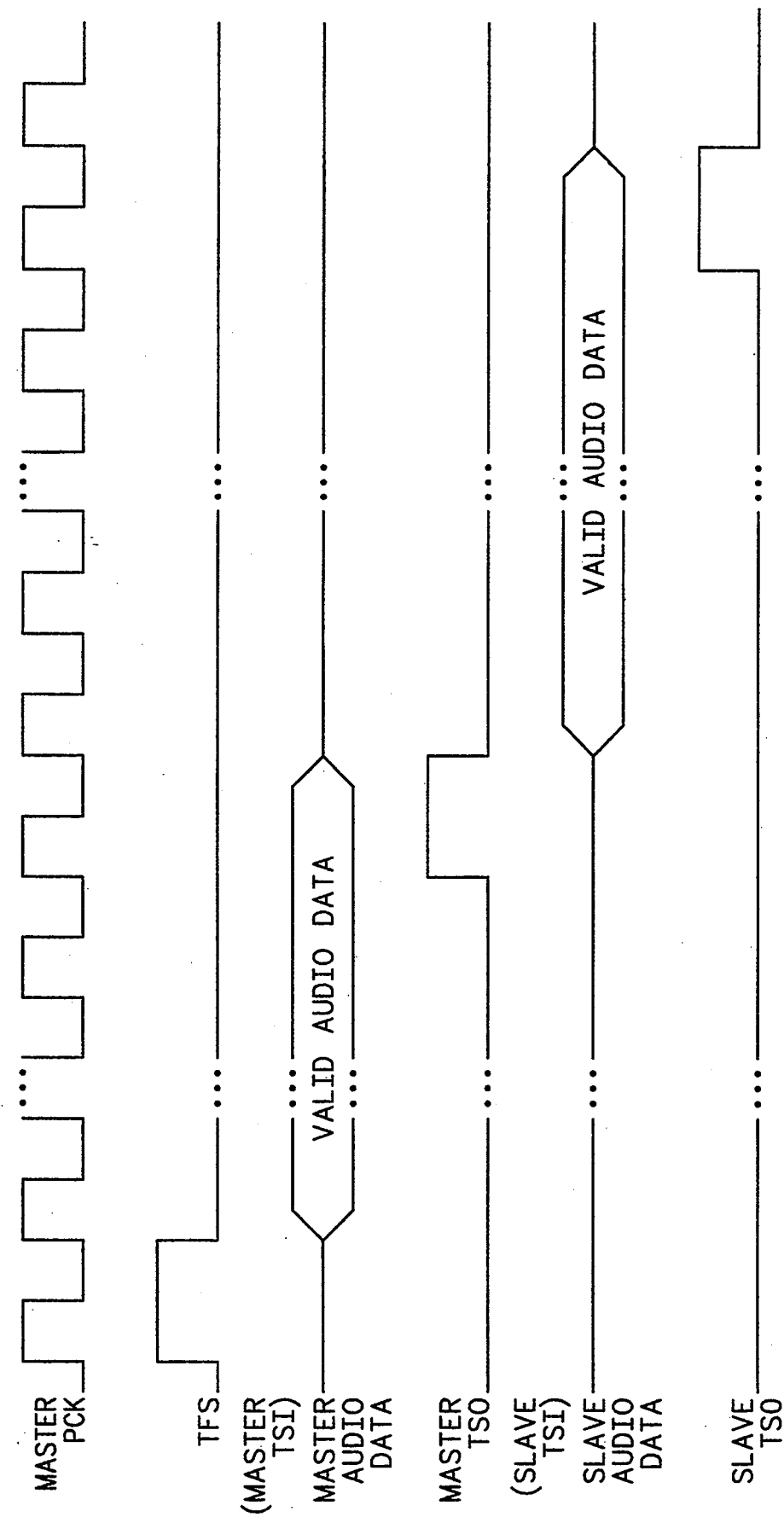
FIG. 8 illustrates in timing diagram form the timing signals provided by the communications system of FIG. 6.

FIG. 8 provides a timing diagram illustrating the daisy chain configuration described above. In quick summary of the figure, a clock signal is provided by the PCK output of transmitter 74. On the sampling edge of a first pulse of the clock signal, the TFS signal is asserted for one clock period. In this implementation, the TFS signal is connected to the TSI input of transmitter 74. On the falling edge of the TSI signal, transmitter 74 receives digital audio data from unmodulated serial data source via the audio conductor of Unmodulated Data bus 79. The TSO signal is asserted a predetermined number of clock cycles from the assertion of the TFS signal. On the failing edge of the TSO signal, data is no longer transferred via the audio conductor of Unmodulated Data bus 79. Concurrently, the TNS signal is asserted on the falling edge of the TSI signal. As was previously mentioned, when the TNS signal is asserted, digital non-audio data is transferred at a slower frequency than the sampling frequency of the digital data transferred via the non-audio conductor of Unmodulated Data bus 79. The TNS signal is enabled to synchronize the transfer of the digital non-audio data from data source 82 until ten PCK cycles before the falling edge of the TSO signal. The TNS signal returns to a high impedance state on the falling edge of the TSO signal.

The TSO) output of master transmitter 74 is tied to the TSI input of slave transmitter 76. Therefore, when the TSO of master transmitter 74 is asserted, the TSI input of slave transmitter 76 is also asserted. Subsequently, data is transmitted from data source 82 to slave transmitter 76 until the TSO output of slave transmitter 76 is negated. On the falling edge of the TSO output, the Data input of transmitter 76 is put in a high impedance state and data is no longer received by transmitter 76. Concurrently, the TNS signal of slave transmitter 76 is asserted on the falling edge of the slave TSI signal. Digital non-audio data is transferred from data source 82 until ten PCK cycles before the falling edge of the TSO signal. At that point, the TNS returns to a high impedance state.

Subsequently, when the TSO output of transmitter 76 is asserted, the TSI input of transmitter 78 is concurrently asserted. Therefore, transmitter 78 is enabled to respectively receive digital audio data from data source 82 via the audio conductor of Unmodulated Data bus 79 until the TSO output of transmitter 78 is negated. Additionally, transmitter 78 is enabled to respectively receive digital non-audio data from data source 82 via the non-audio conductor of Unmodulated Data bus 79 until ten PCK cycles before the TSO output of transmitter 78 is negated. As many transmitters as may provide data during a predetermined clock period may be configured in the daisy-chain configuration illustrated in FIG. 6.

Although not shown herein, the TOE input of transmitter 74 is asserted during operation. The TOE inputs of both transmitters 76 and 78 are negated. Additionally, the TBS signal of transmitter is asserted at the beginning of the transfer of the block of digital data to indicate the start of the block of data. The MSO output of transmitter 74 is connected to the MSI inputs of both transmitter 76 and transmitter 78 so that all of the plurality of transmitters are synchronized.

Additionally, the master of the digital audio communications system 60 may be modified at any time during operation. To modify the master of the system, master controller 80 would designate another one of the plurality of transmitters, 74, 76, and 78, as a master transmitter. The TOE of master transmitter 74 would then be in a high impedance state and the TOE input of another one of the plurality of transmitters would be asserted to indicate a new master transmitter. The new master transmitter then provides a clock frequency to each of the remaining plurality of transmitters in the daisy chain configuration to maintain synchronicity. The TFS and TBS outputs of the new master transmitter will drive the Frame Sync and Block Sync inputs of unmodulated serial data source 82, respectively.

Although the master of the digital audio communication system 60 may change from transmitter to transmitter within the system, an order in which each of the transmitters receives data from unmodulated serial data source 82 remains the same. For example, even if transmitter 78 was a master transmitter, transmitter 74 should still receive digital audio and non-audio data from unmodulated serial data source 82 first. The digital audio data to transmitter 74 would then be followed by digital audio data to transmitter 76. Subsequently, transmitter 78 would receive the digital audio data after transmitter 76. Transmitter 78 would be the master transmitter in the sense that all of the transmitters would be synchronized to the clock signal provided by the PCK output of transmitter 78. The MSO output of transmitter 78 would also be enabled to drive the MSI inputs of the remaining ones of the plurality of transmitters such that all functioned in synchrony. Additionally, the unmodulated serial data source 82 would be synchronized to the TBS and TFS outputs of transmitter 78.

The master transmitter of digital audio communication system 60 would most likely be modified to reflect a difference in the frequency of the unmodulated digital data provided by the unmodulated serial data source 82. Master controller 80 allows a user of communications system 60 to easily change the master transmitter of communication system 60 to reflect a different frequency of an out coming modulated digital data signal.

Such flexibility is advantageous for any user of system 60. Signals of different frequencies may be provided with no rewiring of circuits or complex programming. Rather, master controller 80 and each of the plurality of transmitters work together to receive digital audio and non-audio data from unmodulated serial data source 82 as quickly as possible. Additionally, in digital audio communication system 60, the non-audio data is also concurrently received from serial data source 82 via the non-audio conductor of Unmodulated Data bus 79 using the daisy chain technique described above.

Figure 9:
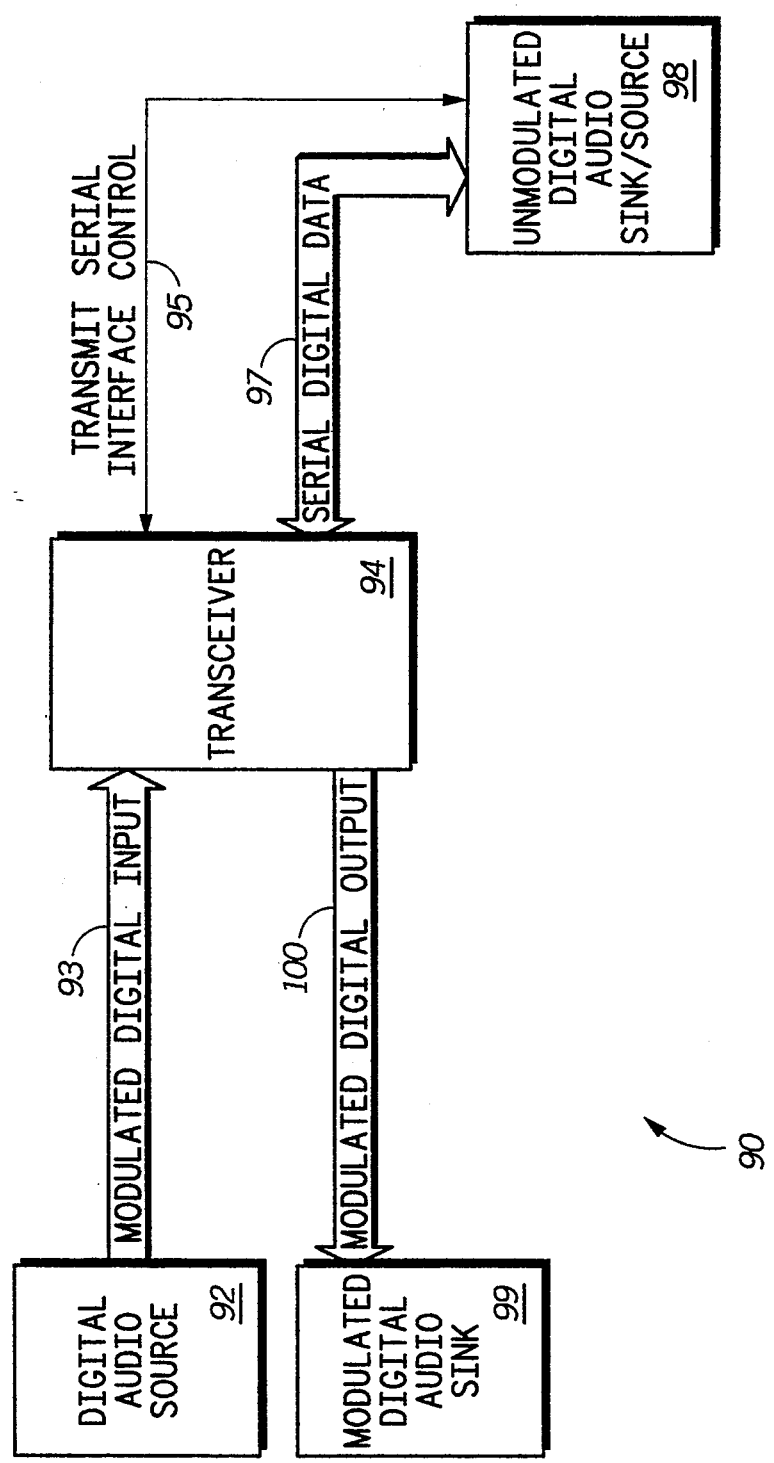
FIG. 9 illustrates in block diagram form a communications system having a transceiver for both transmitting and receiving digital data.

FIG. 9 illustrates a third form of the preferred embodiment of the invention in which the receiver of FIG. 1 and the transmitter of FIG. 5 are merged to form a transceiver which both receives and transmits digital audio data.

A digital audio communications system 90 is illustrated in FIG. 9. Communications system 90 includes a digital audio source 92, a transceiver 94, an unmodulated digital audio sink/source 98, and a modulated digital audio sink 99. Digital audio source 92 is connected to transceiver 94 via a Digital Input bus 93. Transceiver 94 is connected to unmodulated digital audio sink/source 98 via a bidirectional Serial Digital Data bus 97. Additionally, Digital audio sink/source 98 provides control information to transceiver 94 via a Transmit Serial Interface Control bus 95. Interface Control bus 95 includes both the TOE and ROE signals previously discussed. Transceiver 94 is connected to modulated digital audio sink 99 via a Modulated Digital Output bus 100.

In one form, transceiver 94 may be implemented as a Motorola DSP56401 AES/EBU/CP340 Digital Audio Transceiver which is available from Motorola., Inc. of Schaumburg, Ill. Transceiver 94 functions to perform both receive and transmit operations and may be used either singularly or in a daisy chain configuration to process digital audio information between digital audio sources and digital audio sinks.

Therefore, in summary, the invention described herein provides both a receiver and a transmitter for communicating digital audio information using a plurality of bus signals to enable easier interfacing between digital audio sinks and digital audio sources. The present invention provides an interface receiver for receiving a plurality of data values in an AES-EBU or CP-340 format, processing the plurality of data values, and communicating the data values and corresponding control signals. The interface receiver described herein provides a plurality of bus signals which collectively allow communication of data between a digital audio source such as a compact disc or a digital audio tape and a digital sink such as a digital signal processor or a digital to analog (D-A) converter. The plurality of bus signals provided by the interface receiver allow many different storage devices to be used without glue logic. Additionally, the plurality of bus signals provided by the interface receiver allow multiple receivers to be configured in a daisy chain configuration wherein the master is selectively chosen to optimize the performance of such a system. The daisy chain configuration may be implemented to provide digital data to a wide variety of storage circuits for digital information.

Additionally, the present invention provides an interface transmitter for transmitting data from a storage circuit to a digital audio sink. A digital audio sink may be implemented as a digital audio tape recorder, an audio mixer, or even a computer. In addition to the data, the interface transmitter provides a plurality of bus signals which transfer control information to the digital audio sink. As with the interface receiver, the plurality of bus signals provided by the interface transmitter allows a plurality of transmitters to be configured to transmit data from a single storage circuit to a plurality of digital audio sinks without additional glue logic. Again, a master transmitter is selectively chosen to optimize performance of the system.

By providing both an interface receiver and an interface transmitter which enables a digital audio system to have the ability to interface with a plurality of devices, the flexibility of the system is enhanced. Additionally, by providing the bus control signals necessary to allow daisy chaining without glue logic and in which the master receiver or transmitter is selectively chosen, performance of the system may be optimized.

It should be well understood that both the interface receiver and the interface transmitter described herein provide greater flexibility and performance than previous implementations. The implementations of the invention described herein are provided by way of example only, however, and many other implementations may exist for executing the functions described herein. For example, the Block Sync input of unmodulated serial data sink 42 illustrated in FIG. 2 may be implemented as a separate block synchronization input, an interrupt input, or a generic input. Similarly, the Block Sync input of unmodulated serial data source 82 illustrated in FIG. 6 may be implemented as a separate block synchronization input, an interrupt input, or a generic input. Additionally, although the Data outputs of each of the receivers are referred to as a collection of a plurality of outputs which respectively transfer either audio or non-audio data, the Data output may be only a single output which is able to provide digital audio and non-audio data serially. Similarly, although the Data inputs of each of the transmitter are referred to as a collection of a plurality of inputs which respectively receive either audio or non-audio data, the Data output may be only a single input which is able to receive digital audio and non-audio data serially.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A receiver for providing a plurality of digital data values from a modulated digital audio source to an unmodulated data sink via an interface bus, the interface bus comprising:

a receive output enable conductor for providing a receive enable signal generated by a master controller to the receiver, the receive output enable input selectively enabling the receiver to provide digital data;

a receive system clock conductor for providing a system clock signal from a clock source: to the receiver, the receive system clock selectively enabled in response to the receive output enable signal;

a plurality of digital data conductors, a first portion of the plurality of digital data values providing digital audio values and a second portion of the plurality of digital data values providing digital non-audio data values, each of the digital audio and non-audio data values being provided in a predetermined format by the plurality of digital data conductors;

a receive input synchronization conductor for providing a receive input synchronization signal from an input synchronization source, the receive input synchronization signal indicating a start of communication of at least one of a first one of the plurality of digital audio data values and a first one of the plurality of digital non-audio data values;

a receive output synchronization conductor for providing a receive output synchronization signal generated by the receiver, the receive output synchronization signal indicating an end of communication of at least one of the first one of the plurality of digital audio data values and the first one of the plurality of digital non-audio data values; and a frequency lock conductor for providing a lock signal generated by the receiver, the lock signal indicating if the receiver has locked to a frequency of the plurality of digital data values communicated between the modulated digital audio source and the unmodulated data sink.

2. The interface bus of claim 1 wherein each of the digital audio and non-audio data values is provided in a format which is compatible with either an AES-EBU or a CP-340 format.

3. In a data processing system having a plurality of receivers for providing digital data from a plurality of modulated digital audio sources to a plurality of unmodulated serial data sinks via an interface bus, the interface bus comprising:

a receive output enable conductor for providing a receive enable signal from a controller to a first one of the plurality of receivers, the receive output enable input selectively enabling the first one of the plurality of receivers to provide control information necessary to synchronize each of the plurality of receivers to one another;

a receive system clock conductor for providing a system clock signal to each one of the plurality of receivers, the receive system clock generated by the first one of the plurality of receivers;

a plurality of digital data conductors, a first portion of the plurality of digital data values transferring digital audio values and a second portion of the plurality of digital data values transferring digital non-audio data values, each of the digital audio and non-audio data values being transferred in a predetermined format by the plurality of digital data conductors from one of the plurality of receivers;

a receive frame synchronization conductor for communicating a receive frame synchronization signal, the receive frame synchronization signal indicating a start of communication of at least one of a first one of the plurality of digital audio data values and a first one of the plurality of digital non-audio data values, the first one of the plurality of receivers providing the receive frame synchronization signal to each of the remaining portion of the plurality of receivers;

a plurality of receive input synchronization conductors for communicating a plurality of receive input synchronization signals, each one of the plurality of receivers receiving a predetermined one of the plurality of receive input synchronization signals, a second one of the plurality of receivers receiving the receive frame synchronization signal as a corresponding one of the plurality of receive input synchronization signals; and a plurality of receive output synchronization conductors for communicating a plurality of receive output synchronization signals, the plurality of receive output synchronization signals indicating an end of communication of at least one of the first one of the plurality of digital audio data values and the first one of the plurality of digital non-audio data values, a first receive output synchronization signal corresponding to the second one of the plurality of receivers providing a receive input synchronization signal to a predetermined one of the remaining portion of the plurality of receivers, each of the remaining receive output synchronization signals being provided to a predetermined one of the plurality of receivers.

4. The interface bus of claim 3 wherein the first one of the plurality of receivers is the same as the second one of the plurality of receivers.

5. The interface bus of claim 3 further comprising:

a plurality of frequency lock conductors for providing a plurality of lock signals, each of the plurality of lock signals indicating if a corresponding one of the plurality of receivers has locked to a frequency of the plurality of digital data values communicated between the modulated digital audio source and the unmodulated data sink.

6. The interface bus of claim 5 wherein the receive enable signal is provided to the first one of the plurality of receivers in response to one of the plurality of lock signals.

7. The interface bus of claim 5 wherein only one of the plurality of lock signals is asserted at a predetermined point in time.

8. The interface bus of claim 3 wherein each of the digital audio and non-audio data values is communicated in a format which is compatible with either an AES-EBU or a CP-340 format.

9. In a data processing system having a plurality of transmitters for transmitting digital data from a plurality of unmodulated data sources to a plurality of modulated digital audio sinks via an interface bus, the interface bus comprising:

a transmit output enable conductor for providing a transmit enable signal to a first one of the plurality of transmitters, the transmit output enable signal selectively enabling the first one of the plurality of transmitters to provide control information necessary to synchronize each of the plurality of transmitters to one another;

a transmit system clock conductor for providing a system clock signal generated by the first one of the plurality of transmitters to each one of the plurality of transmitters;

a plurality of digital data conductors, a first portion of the plurality of digital data values transferring digital audio values and a second portion of the plurality of digital data values transferring digital non-audio data values, each of the digital audio and non-audio data values being transferred in a predetermined format from one of the plurality of transmitters by the plurality of digital conductors;

a transmit frame synchronization conductor for communicating a transmit frame synchronization signal, the transmit frame synchronization signal indicating a start of communication of at least one of a first one of the plurality of digital audio data values and a first one of the plurality of digital non-audio data values, the first one of the plurality of transmitters providing the transmit frame synchronization signal;

a plurality of transmit input synchronization conductors for providing a plurality of transmit input synchronization signals, each one of the plurality of transmitters receiving a predetermined one of the plurality of transmit input synchronization signals, a second one of the plurality of transmitters receiving the transmit frame synchronization signal as a corresponding one of the plurality of transmit input synchronization signals; and a plurality of transmit output synchronization conductors for communicating a plurality of transmit output synchronization signals, the plurality of transmit output synchronization signals indicating an end of communication of at least one of the first one of the plurality of digital audio data values and the first one of the plurality of digital non-audio data values, a first transmit output synchronization signal corresponding to the second one of the plurality of transmitters providing a transmit input synchronization signal to a predetermined one of the remaining portion of the plurality of transmitters, each of the remaining transmit output synchronization signals being provided to a predetermined one of the plurality of transmitters.

10. The interface bus of claim 9 wherein the first one of the plurality of transmitters is the same as the second one of the plurality of transmitters.

11. The interface bus of claim 9 further comprising:
a modulator synchronization output conductor for transferring a modulator synchronization output signal from the first one of the plurality of transmitters, the modulator synchronization output signal asserted by the first one of the plurality of transmitters in response to the transmit enable signal to indicate that the first one of the plurality of transmitters controls synchronization of each of the plurality of transmitters; and a modulator synchronization input conductor for communicating a modulator synchronization input signal, the modulator synchronization input signal being provided to each of the remaining portion of the plurality of transmitters to indicate that the first one of the plurality of transmitters controls synchronization of each of the plurality of transmitters, the modulator synchronization input signal provided by the modulator synchronization output signal of the first one of the plurality of transmitters.

12. A digital audio processing system having a plurality of transceivers, the plurality of transceivers communicating digital data having an audio portion and a non-audio portion via an interface bus, the interface bus comprising:

an enable conductor for providing an enable signal to a first one of the plurality of transceivers from a controller, the enable input selectively enabling the first one of the plurality of transceivers to either transmit or receive digital data;

a system clock conductor for providing a clock signal to each one of the plurality of transceivers, the clock signal provided by the first one of the plurality of transceivers;

a plurality of digital data conductors, a first portion of the plurality of digital data values either receiving or transmitting digital audio values and a second portion of the plurality of digital data values either receiving or transmitting digital non-audio data values, each of the digital audio and non-audio data values being communicated in a predetermined format from one of the plurality of transceivers;

a frame synchronization conductor for communicating a frame synchronization signal, the frame synchronization signal indicating a start of either receipt or transmission of at least one of a first one of the plurality of digital audio data values and a first one of the plurality of digital non-audio data values, the first one of the plurality of transceivers providing the frame synchronization signal;

a plurality of input synchronization conductors for communicating a plurality of input synchronization signals, each one of the plurality of transceivers receiving a predetermined one of the plurality of input synchronization signals, a second one of the plurality of transceivers receiving the frame synchronization signal as a corresponding one of the plurality of input synchronization signals; and a plurality of output synchronization conductors for communicating a plurality of output synchronization signals, the plurality of output synchronization signals indicating an end of either receipt or transmission of at least one of the first one of the plurality of digital audio data values and the first one of the plurality of digital non-audio data values, a first output synchronization signal corresponding to the second one of the plurality of transceivers providing an input synchronization signal to a predetermined one of the remaining portion of the plurality of transceivers, each of the remaining output synchronization signals being provided to a predetermined one of the plurality of transceivers.

13. The digital audio processing system of claim 12 further comprising:
a plurality of modulator synchronization conductors for providing a plurality of modulator synchronization signals, the plurality of modulator synchronization signals synchronizing a transmitter portion of each of the plurality of transceivers to a transmitter portion of the first one of the plurality of transceivers during communication of the plurality of digital audio values.

14. The interface bus of claim 12 further comprising:
a plurality of frequency lock conductors for communicating a plurality of lock signals, each of the plurality of lock signals indicating if a corresponding one of the plurality of transceivers has locked to a frequency of the plurality of digital data values communicated between the modulated digital audio source and the unmodulated data sink.

15. The interface bus of claim 14 wherein one of the plurality of lock signals is provided to a first one of the plurality of transceivers in response to the receive enable signal.

16. The interface bus of claim 14 wherein only one of the plurality of lock signals is asserted at a predetermined point in time.

17. The interface bus of claim 12 wherein each of the digital audio and non-audio data values is communicated in a format which is compatible either an AES-EBU or a CP-340 format.

18. The interface bus of claim 12 wherein the plurality of modulator synchronization signals is further comprised of:
a modulator synchronization output conductor for communicating a modulator synchronization output signal, the modulator synchronization output signal asserted by the first one of the plurality of transmitters in response to the transmit enable signal to indicate that the first one of the plurality of transmitters controls synchronization of each of the plurality of transmitters; and a modulator synchronization input conductor for communicating a modulator synchronization input signal, the modulator synchronization input signal being provided to each of the remaining portion of the plurality of transmitters to indicate that the first one of the plurality of transmitters controls synchronization of each of the plurality of transmitters, the modulator synchronization input signal provided by the modulator synchronization output signal of the first one of the plurality of transmitters.

19. In a digital audio communication system, a method for receiving a plurality of digital audio information values from a plurality of digital audio sources to a digital audio sink, comprising the steps of:

providing a plurality of receivers, each of the receivers receiving the plurality of digital audio information values from a respective one of the plurality of digital audio sources, each one of the plurality of receivers providing the plurality of digital audio information values to the digital audio sink in a predetermined audio serial data bus protocol;

providing a receive output enable signal to a first one of the plurality of receivers, the receive output enable signal enabling the first one of the plurality of receivers to provide a receive system clock signal to each of the plurality of receivers;

providing a receive input synchronization signal from a second one of the plurality of receivers to both the digital audio sink and the first one of the plurality of receivers, the receive input synchronization signal indicating a beginning of a first one of the plurality of digital audio data values transferred from the second one of the plurality of receivers in the audio serial data bus protocol;

transferring the first one of the plurality of digital audio data values from the second one of the plurality of receivers to the digital audio sink upon receipt of the receive input synchronization signal;

providing a first receive output synchronization signal from the second one of the plurality of receivers to a third one of the plurality of receivers, the first receive output synchronization signal indicating an end of the first one of the plurality of digital audio using the first receive output synchronization signal to enable the third one of the plurality of receivers to transfer a second one of the plurality of digital audio data values in the serial data bus protocol to the digital audio sink. data values; and 20. The interface bus of claim 19 wherein the first one of the plurality of receivers is the same as the second one of the plurality of receivers.

21. The method of claim 19 further comprising the step of:

providing a second receive output synchronization signal from the third one of the plurality of receivers to a fourth one of the plurality of receivers.

22. The method of claim 19 further comprising the step of:

providing a plurality of frequency lock conductors for communicating a plurality of lock signals, each of the plurality of lock signals indicating if a corresponding one of the plurality of transceivers has locked to a frequency of the plurality of digital data values communicated between the modulated digital audio source and the unmodulated data sink.

23. The interface bus of claim 22 wherein only one of the plurality of lock signals is asserted at a predetermined point in time.

24. The interface bus of claim 19 wherein the predetermined audio serial data bus protocol is a format which is compatible with either an AES-EBU or a CP-340 format.

25. In a digital audio communication system, a method for transmitting a plurality of digital audio information values from a digital audio source to a plurality of digital audio sinks, comprising the steps of:

providing a plurality of transmitters for transmitting the plurality of digital audio information values from the digital audio source to a respective one of the plurality of digital audio sinks, each one of the plurality of transmitters receiving the plurality of digital audio information values from the digital audio source in a predetermined audio serial data bus protocol;

providing a transmit output enable signal to a first one of the plurality of transmitters, the transmit output enable signal enabling the first one of the plurality of transmitters to provide a transmit system clock signal to each of the plurality of transmitters;

providing a transmit input synchronization signal from a second one of the plurality of transmitters to both the digital audio source and the first one of the plurality of transmitters, the transmit input synchronization signal indicating a beginning of a first one of the plurality of digital audio data values transferred to the second one of the plurality of transmitters in the audio serial data bus protocol;

transferring the first one of the plurality of digital audio data values to the second one of the plurality of transmitters from the digital audio source upon receipt of the transmit input synchronization signal by the second one of the plurality of transmitters;

providing a first transmit output synchronization signal from the second one of the plurality of transmitters to a third one of the plurality of transmitters, the first transmit output synchronization signal indicating an end of the first one of the plurality of digital audio data values; and using the first transmit output synchronization signal to enable the third one of the plurality of transmitters to receive a second one of the plurality of digital audio data values in the serial data bus protocol.

26. The method of claim 25 further comprising the step of:

providing a second transmit output synchronization signal from the third one of the plurality of transmitters to a fourth one of the plurality of transmitters.

27. The method of claim 25 further comprising the steps of:

providing a modulator synchronization output conductor for communicating a modulator synchronization output signal, the modulator synchronization output signal asserted by the first one of the plurality of transmitters in response to the transmit enable signal to indicate that the first one of the plurality of transmitters controls synchronization of each of the plurality of transmitters; and providing a modulator synchronization input conductor for communicating a modulator synchronization input signal, the modulator synchronization input signal being provided to each of the remaining portion of the plurality of transmitters to indicate that the first one of the plurality of transmitters controls synchronization of each of the plurality of transmitters, the modulator synchronization input signal provided by the modulator synchronization output signal of the first one of the plurality of transmitters.

* * * * *

UNITED STATES PATENT AND TRADEMARK OFFICE
CERTIFICATE OF CORRECTION

PATENT NO. : 5,359,626
DATED : Oct. 25, 1994
INVENTOR(S) : Kevin L. Kloker, et al.

It is certified that error appears in the above-indentified patent and that said Letters Patent is hereby corrected as shown below:

Column 27, line 42, after "audio" insert --data values; and--

Column 27, line 47, after "sink." delete [data values; and]

Signed and Sealed this

Twentieth Day of June, 1995

Attest:

BRUCE LEHMAN

Attesting Officer     Commissioner of Patents and Trademarks